(12) United States Patent
Redding et al.

(10) Patent No.: US 10,769,525 B2
(45) Date of Patent: Sep. 8, 2020

(54) DECISION MAKING FOR AUTONOMOUS VEHICLE MOTION CONTROL

(71) Applicant: Apple Inc., Cupertino, CA (US)

(72) Inventors: Joshua D. Redding, San Jose, CA (US); Luke B. Johnson, Sunnyvale, CA (US); Martin Levihn, San Jose, CA (US); Nicolas F. Meuleau, San Francisco, CA (US); Sebastian Brechtel, Zurich (CH)

(73) Assignee: Apple Inc., Cupertino, CA (US)

( * ) Notice: Subject to any disclaimer, the term of this patent is extended or adjusted under 35 U.S.C. 154(b) by 530 days.

(21) Appl. No.: 15/713,326

(22) Filed: Sep. 22, 2017

(65) Prior Publication Data
US 2018/0089563 A1    Mar. 29, 2018

Related U.S. Application Data

(60) Provisional application No. 62/398,938, filed on Sep. 23, 2016.

(51) Int. Cl.
| | | |
|---|---|---|
| G06N 3/08 | (2006.01) | |
| G06N 7/00 | (2006.01) | |
| G05D 1/00 | (2006.01) | |
| G06N 3/02 | (2006.01) | |
| B60W 30/00 | (2006.01) | |
| G05B 13/02 | (2006.01) | |
| G06F 16/901 | (2019.01) | |
| G06N 5/00 | (2006.01) | |

(52) U.S. Cl.
CPC ............... *G06N 3/08* (2013.01); *B60W 30/00* (2013.01); *G05B 13/027* (2013.01); *G05D 1/0088* (2013.01); *G06F 16/9027* (2019.01); *G06N 3/02* (2013.01); *G06N 5/003* (2013.01); *G06N 7/005* (2013.01); *G05D 2201/0213* (2013.01)

(58) Field of Classification Search
CPC ............ G06N 3/08; G06N 7/005; G06N 3/02; G06N 5/003; G06N 3/006; G06N 3/0454; G06N 3/084; G05D 1/0088; G05D 2201/0213; B60W 30/00; G05B 13/027
See application file for complete search history.

(56) References Cited

U.S. PATENT DOCUMENTS

| | | | |
|---|---|---|---|
| 9,612,123 B1* | 4/2017 | Levinson | ............... B60Q 1/525 |
| 2013/0035846 A1* | 2/2013 | Shih-Chia | .......... G01C 21/3438 |
| | | | 701/408 |

OTHER PUBLICATIONS

David Silver, et al., "Mastering the Game of Go with Deep Neural Networks and Tree Search," Published in "Nature" Jan. 28, 2016, pp. 1-37.

(Continued)

*Primary Examiner* — Marthe Y Marc-Coleman
(74) *Attorney, Agent, or Firm* — Robert C. Kowert; Kowert, Hood, Munyon, Rankin & Goetzel, P.C.

(57) ABSTRACT

A behavior planner for a vehicle generates a plurality of conditional action sequences of the vehicle using a tree search algorithm and heuristics obtained from one or more machine learning models. Each sequence corresponds to a sequence of anticipated states of the vehicle. At least some of the action sequences are provided to a motion selector of the vehicle. The motion selector generates motion-control directives based on the received conditional action sequences and on data received from one or more sensors of the vehicle, and transmits the directives to control subsystems of the vehicle.

20 Claims, 13 Drawing Sheets

(56) References Cited

OTHER PUBLICATIONS

Sebastian Brechtel, et al., "Dynamic Decision-making in Continuous Partially Observable Domains: A Novel Method and its Application for Autonomous Driving," This document is licensed under the Creative Commons Attribution 3.0 DE License, Jul. 6, 2015, pp. 1-225.

Wikipedia, "Monte Carlo tree search," https:/en.wikipedia.org/wiki/Monte_Carlo_tree_search, Jul. 14, 2016, pp. 1-9.

Guillaume Chaslot, et al., "Monte-Carlo Tree Search: A New Framework for Game AI," Copyright c 2008, Association for the Advancement of Artificial Intelligence (www.aaai.org), pp. 216-217.

Douglas C. Whitaker, "A Brief Description of Monte Carlo Tree Search," Dec. 9, 2011, pp. 1-4.

International Search report and written opinion from PCT/US2017/053086, dated Dec. 1, 2017, Apple Inc., pp. 1-14.

Yang Bai et al, "An Online Approach for Intersection Navigation of Autonomous Vehicle", 2014 IEEE International Conference on Robotics and Biomimetics, Dec. 5, 2014, pp. 1-6.

Andrew Kramer et al, "Operational Planning and Programming of Autonomous Underwater Vehicles", Jun. 12, 1989, pp. 1-16.

David Lenz et al, "Tactical Cooperative Planning for Autonomous Highway Driving using Monte-Carlo Tree Search", 2016 IEEE Intelligent Vehicles Sumposium, Jun. 19, 2016, pp. 1-8.

Tobias Graf et al, "Using Deep Convolutional Neural Networks in Monte Carlo Tree Search", Jul. 1, 2016, pp. 1-12.

\* cited by examiner

DECISION MAKING FOR AUTONOMOUS VEHICLE MOTION CONTROL

This application claims benefit of priority to U.S. Provisional Application No. 62/398,938, filed Sep. 23, 2016, titled "Decision Making For Autonomous Vehicle Motion Control," which is hereby incorporated by reference in its entirety.

BACKGROUND

Technical Field

This disclosure relates generally to systems and algorithms for planning and controlling the motion of autonomous or partially autonomous vehicles.

Description of the Related Art

Motorized vehicles which are capable of sensing their environment and navigating to destinations with little or no ongoing input from occupants, and may therefore be referred to as "autonomous" or "self-driving" vehicles, are an increasing focus of research and development. Until relatively recently, due to the limitations of the available hardware and software, the maximum speed at which computations for analyzing relevant aspects of the vehicle's external environment could be performed was insufficient to enable non-trivial navigation decisions to be made without human guidance. Even with today's fast processors, large memories, and advanced algorithms, however, the task of making timely and reasonable decisions (which are based neither on excessively pessimistic assumptions, nor on excessively optimistic assumptions) regarding an autonomous vehicle's trajectory in the context of unpredictable behaviors of other entities (such as other drivers or other autonomous vehicles) and incomplete or noisy data about the vehicle's environment in real-world traffic remains a significant challenge.

SUMMARY OF EMBODIMENTS

Various embodiments of methods and apparatus for decision making to manage the trajectories or motions of an autonomous vehicle are described. According to one embodiment, the decision making components associated with an autonomous vehicle may comprise at least a behavior planner and a motion selector. One or both of the behavior planner and the motion selector may comprise respective sets of computing devices. The behavior planner may be configured to generate candidate sequences of conditional actions and associated anticipated state changes for the vehicle for some selected time horizons (e.g., on the order of tens of seconds, or a few minutes) in an iterative fashion, and provide at least some of the sequences generated during various planning iterations to the motion selector. The sequences may also be referred to as policies. An action may comprise, for example, an acceleration to a particular speed, a lane change, a deceleration to a particular speed, and so on, and may be associated with a brief time period of a few seconds. A given state may represent the positions, velocities, and/or other attributes of the autonomous vehicle being controlled, information about the road topology including lane lines, stop signs, road surface etc., as well as other vehicles and other entities in the external environment of the autonomous vehicle. A transition from one state to another, caused by a particular action taken in the first state of the two, may be associated with a conditional probability (as the action may potentially lead to several other next-states). In at least some embodiments, the behavior planner may be configured to utilize a decision tree-based technique, such as a variant of a Monte Carlo Tree Search algorithm, to generate the policies. In one embodiment, heuristics obtained from one or more machine learning models, such as deep neural network models, may be used to optimize execution of the decision-tree algorithms—e.g., one or more neural networks may be used to limit the breadth of a tree search, while another neural network may be used to limit the depth to which a tree is searched.

The motion selector may use the policies, as well as a number of additional inputs, to generate low-level commands or directives which are then transmitted to various motion-control subsystems of the vehicle (such as the braking subsystem, accelerating subsystem, turning subsystem and the like), causing the vehicle to move along a particular trajectory selected by the motion selector. The commands or directives may typically be issued at a faster rate in some embodiments than the rate at which the motion selector receives the policies from the behavior planner. In various embodiments, the autonomous vehicle may comprise a number of different types of sensor devices, including for example various kinds of externally-oriented and/or occupant-oriented cameras, Global Positioning System (GPS) devices, radar devices, light detection and ranging (LIDAR) devices and the like. The output of the sensor devices, indicative of the environment or "world" within which the autonomous vehicle is operating, may be sampled at different rates by the behavior planner and the motion selector in some embodiments. The motion selector may be considered the final arbiter with respect to realized trajectories of the vehicle, which may for example involve responding to emergency situations and/or unpredicted behaviors of other entities, and the motion selector may therefore sample the sensor data at a faster rate (a higher frequency) than the behavior planner (which makes somewhat longer-term and probabilistic decisions). One or both decision making components may be configured to be able to deal with incomplete or noisy data sets from the sensors, as in the case when obstacles partially obscure a view.

In some embodiments, statistical distributions of recorded actions taken by real-world drivers may be used to generate the policies. For example, a supervised learning algorithm (which may comprise the use of a neural network) may utilize the recorded actions to learn the kinds of actions that are taken most often under certain driving conditions, and therefore to construct policies more efficiently using such representative actions instead of giving equal consideration to rarely-employed or unsuccessful actions. In at least one embodiment, a reinforcement learning algorithm (which may comprise the use of a different neural network) may be used to learn from simulating driver behavior. Neural networks may also be used to recursively estimate the values of different action sequences, e.g., by aggregating rewards computed for individual states encountered in the action sequence. The reward and value computations may include quantifications of several different types of factors, such as the likelihood of timely arrival at the destination, physical feasibility, traffic rule compliance, the kinds of social interactions which may result from various actions, and/or occupant comfort/stress. In some cases, the reward and value computations may be personalized for different vehicle occupants—e.g., some occupants may place a higher priority on minimizing transit time relative to other factors. In at least one embodiment, before passing on a policy to the motion selector, the behavior planner may ensure that the policy meets minimum acceptance criteria defined in terms of similar factors, so that the motion selector only has to deal with a relatively small subset of alternatives. At least some of the functionality of the behavior planner may be performed using resources external to the vehicle in some embodiments—e.g., servers located at a data center may be used to train and/or execute some of the machine learning models. However, in various embodiments in which external resources can be used, the vehicle's on-board decision making components may be engineered to withstand communication failures with the external resources.

In at least one embodiment, the decision-making components associated with the vehicle may include other components, including for example a route planner and a lane-level planner, in addition to the behavior planner and the motion selector. The components may be logically organized in a hierarchy based on the granularity of the decisions made, with the route planner at the highest level of the hierarchy and responsible for making the broadest decisions, followed by the lane-level planner, the behavior planner and the motion selector.

According to at least some embodiments, a method may comprise generating one or more conditional action sequences at a behavior planner associated with a vehicle. The sequences may be generated using a combination of decision tree algorithms and heuristics obtained from one or more machine learning models. At least some action sequences may be selected (e.g., based on recursive evaluation techniques that take factors such as timeliness, obeying of traffic laws, and the like into account) and transmitted to a motion selector. The method may further comprise the motion selector generating one or more motion-control directives based on analyzing sensor data and on the action sequences received from the behavior planner, and transmitting the directives to motion control subsystems for implementation to achieve a selected trajectory. In some cases, alternative conditional action sequences may be generated in parallel—e.g., the processing required for generating one conditional action sequence may be performed using one set of computing devices, and the processing required for generating another conditional action sequence may be performed using another set of computing devices during a time period which overlaps at least partly with the time period during which processing of the first sequence is performed.

According to one embodiment, a non-transitory computer-accessible storage medium storing program instructions that when executed on one or more processors may implement a behavior planner for a vehicle. The behavior planner may obtain respective data sets from one or more sensors of the vehicle. Using the data sets, a tree search algorithm and heuristics generated by one or more machine learning models, the behavior planner may generate one or more action sequences for the vehicle. At least some of the sequences may be transmitted to a motion selector configured to use the sequences to generate and issue one or more motion-control directives which cause the vehicle to move.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Figure 1:
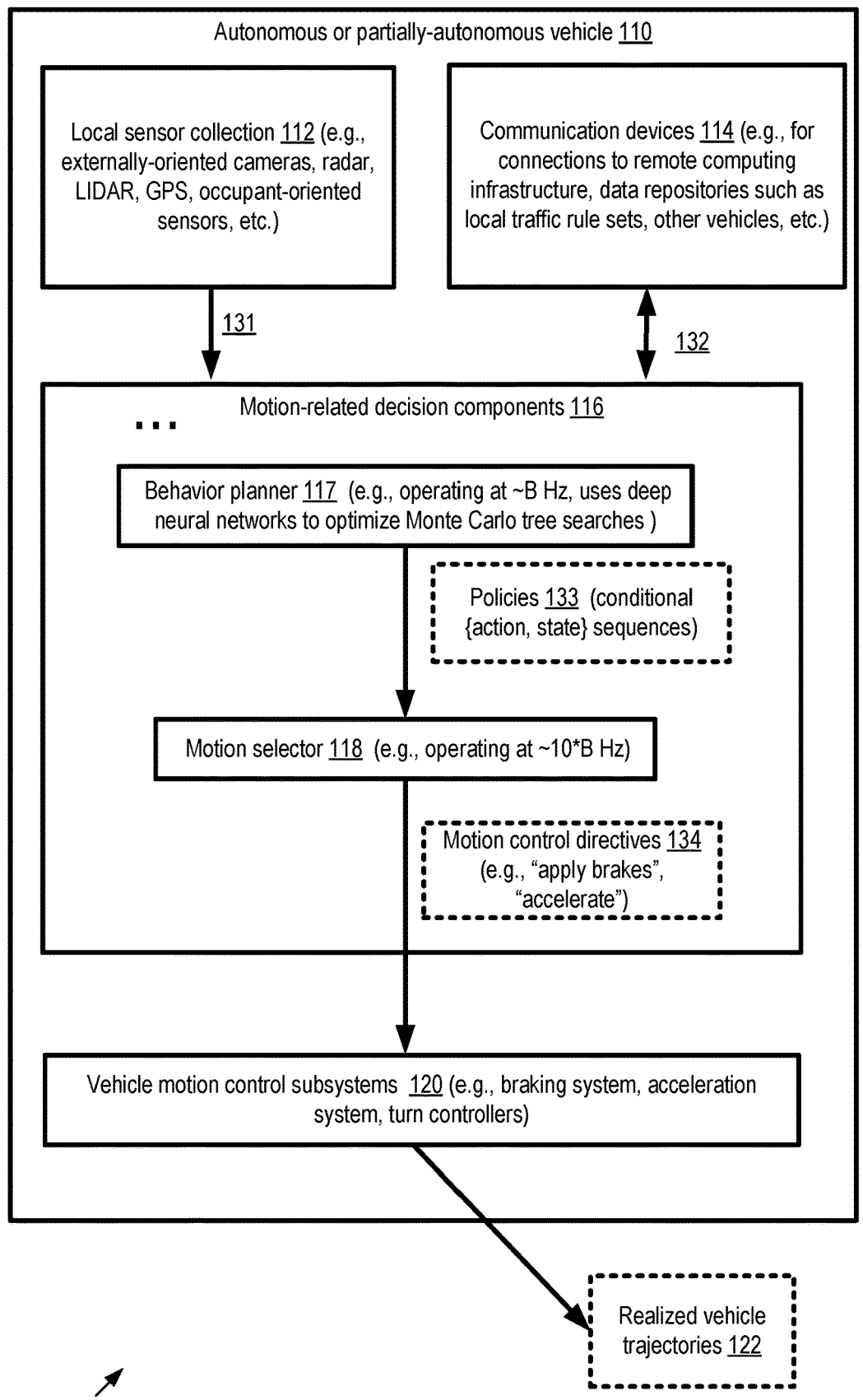
FIG. 1 illustrates an example system environment in which decision making components of an autonomous vehicle may utilize tree search algorithms in combination with neural network models to control the trajectory of the vehicle, according to at least some embodiments.

FIG. 1 illustrates an example system environment in which decision making components of an autonomous vehicle may utilize tree search algorithms in combination with neural network models to control the trajectory of the vehicle, according to at least some embodiments. As shown, system 100 comprises an autonomous or partially-autonomous vehicle 110. The term "autonomous vehicle" may be used broadly herein to refer to vehicles for which at least some motion-related decisions (e.g., whether to accelerate, slow down, change lanes, etc.) may be made, at least at some points in time, without direct input from the vehicle's occupants. In various embodiments, it may be possible for an occupant to override the decisions made by the vehicle's decision making components, or even disable the vehicle's decision making components at least temporarily; furthermore, in at least one embodiment, a decision-making component of the vehicle may request or require an occupant to participate in making some decisions under certain conditions. To help introduce the algorithms which may be used for planning and controlling the vehicle's movements, four types of components of the vehicle 110 are shown in FIG. 1: motion-related decision making components 116, local sensor collection 112, motion control subsystems 120 and communication devices 114. The decision making components 116 may comprise multiple tiers or layers in the depicted embodiment, including but not necessarily limited to a behavior planner 117 and a motion selector 118 (examples of other decision making tiers are discussed below in the context of FIG. 10).

The motion control subsystems 120, such as the braking system, acceleration system, turn controllers and the like may collectively be responsible for causing various types of movement changes (or maintaining the current trajectory) of vehicle 110, e.g., in response to directives or commands issued by the decision making components 116, resulting in the actual or realized trajectory 122. In the tiered approach towards decision making illustrated in FIG. 1, the motion selector 118 may be responsible for issuing relatively fine-grained motion control directives to various motion control subsystems, as indicated by arrow 134. The rate at which directives are issued to the motion control subsystems 120 may vary in different embodiments—for example, in some implementations the motion selector 118 may issue one or more directives approximately every 40 milliseconds, which corresponds to an operating frequency of about 25 Hertz for the motion selector 118. Of course, under some driving conditions (e.g., when a cruise control feature of the vehicle is in use on a straight highway with minimal traffic) directives to change the trajectory may not have to be provided to the motion control subsystems at some points in time. For example, if a decision to maintain the current velocity of the vehicle is reached by the decision making components, and no new directives are needed to maintain the current velocity, the motion selector may not issue new directives every T milliseconds even though it may be capable of providing such directives at that rate.

The motion selector 118 may determine the content of the directives to be provided to the motion control subsystems (i.e., whether braking to slow speed by X units is required, whether acceleration by Y units is required, whether a turn or lane change is to be implemented, etc.) based on several inputs in the depicted embodiment, including conditional action and state sequences generated by the behavior planner 117 (as indicated by arrow 133), as well as data obtained from sensor collection 112. The conditional action and state sequences may be denoted using the notation {action, state} or {a, s} herein, and may also be referred to as "policies" or as "action sequences." An action sequence may represent a selected set of options for the vehicle's future trajectories, generated by the behavior planner using techniques involving a number of models as described below in further detail. Sensor data may also be used by the behavior planner 117 in at least one embodiment to generate the action and state sequences. Inputs may be collected at various sampling frequencies from individual sensors of the vehicle's sensor collection 112 in different embodiments by the behavior planner 117 and/or the motion selector 118—e.g., in one embodiment, the output from a given sensor may be sampled at approximately 10× the rate at the motion selector than the rate at which the output is sampled by the behavior planner. Different sensors may be able to update their output at different maximum rates in some embodiments, and as a result the rate at which the output is obtained at the behavior planner and/or the motion selector may also vary from one sensor to another. A wide variety of sensors may be included in collection 112 in the depicted embodiment, including externally-oriented cameras, occupant-oriented sensors (which may, for example, include cameras pointed primarily towards occupants' faces, or physiological signal detectors such as heart rate detectors and the like, and may be able to provide evidence of the comfort level or stress level of the occupants), Global Positioning System (GPS) devices, radar devices, LIDAR (light detection and ranging) devices and so on. In addition to conventional video and/or still cameras, in some embodiment near-infrared cameras and/or depth cameras may be used. In one embodiment, one or more of the communication devices 114 may also play the role of a sensor—e.g., signals regarding the state and/or plans of other autonomous or non-autonomous vehicles in the vicinity may be collected via any appropriate communication protocol.

In one approach used for managing the movements of vehicle 110, the behavior planner 117 may generate several alternative policies comprising respective sequences of conditional actions and states which may be reached as a result of the actions, and provide the alternatives together with associated metadata (e.g., reward or value metrics indicating the "relative goodness" of the alternatives based on currently-known information) to the motion selector 118. The plans may be provided at a slower rate to the motion selector 118 than the rate at which directives 134 are expected to be provided to the control subsystems 120 in some embodiments (the slower rate may result, for example, from the amount of computations performed to generate the alternatives). As shown in the example of FIG. 1, the ratio of the operating frequencies of the motion selector 118 and the behavior planner 117 may be approximately 10:1 in some embodiments (e.g., if the rate at which updated {a, s} sequences are provided to the motion selector is approximately B Hertz, the rate at which directives are to be provided to the motion control subsystems may be approximately 10*B Hertz). Other frequency ratios may be used in different embodiments—the ratio shown in FIG. 1 is provided as an example and is not intended to be limiting.

The behavior planner 117 may utilize one or more Monte Carlo Tree Search (MCTS) algorithms to generate the {a, s} sequences to be provided to the motion selector in the depicted embodiment. In at least some embodiments, heuristics for optimizing the MCTS algorithms (e.g., for limiting the sizes of the trees that are constructed, limiting the breadth of a tree search at a given level by identifying a subset of nodes which correspond to "more useful" actions, and/or for limiting the depth of a tree search based on assigned node values) may be obtained from one or more deep neural networks. MCTS is an approach for decision making, sometimes used in automated game player systems, which combines the generality of random simulation with the precision of tree search algorithms often employed in machine learning systems. Additional details regarding the manner in which MCTS may be adapted for controlling the movements of self-navigating vehicles, and the manner in which neural networks may be employed to enhance the tree searches involved, are provided below. In some embodiments, at least some of the heuristics may be obtained in an offline mode (before the decisions which rely on the heuristics have to be made in real time). In other embodiments, the heuristics may be obtained in real time or near real time. In some embodiments, machine learning models other than neural networks may be used to optimize decision tree searches.

In one embodiment, at least some of the computations involved in generating the {a, s} sequences or policies may be performed at remote computing devices—e.g., at a pool of servers optimized for training and running artificial neural network models and/or MCTS algorithms. In such an embodiment, the communication devices 114 (which may comprise hardware and/or software components used for wireless or telephony-based communication channels of any appropriate types) may be used to obtain policies, provide sensor data from the vehicle to the remote computing devices, and so on. In some embodiments, policies may be generated both locally (using computing devices incorporated within the vehicle 110) as well as remote devices—for example, an {a, s} sequence for a short time period (or a short state change sequence length) may be generated locally, while {a, s} sequences for longer terms may be generated remotely. The extent to which decision making is performed locally versus remotely may vary over time in some embodiments, as discussed in further detail below with respect to FIG. 9—e.g., if communication with a remote facility becomes difficult or unavailable, more decisions (of potentially lower complexity or duration) may be generated locally temporarily, until communication quality is restored. In one embodiment, regardless of whether decisions are generated at least in part locally or not, the communication devices 114 may be used to transmit data about the vehicle's state (and/or local actions taken in various states) to a remote data repository, where the data may later be analyzed and utilized to enhance future decision making. In at least one embodiment, several different policies may be generated at least in part in parallel—e.g., policy A may be generated using one set of execution threads or processors, while policy B may be generated (at least partly concurrently) using another set of execution threads or processors. Individual policies produced by behavior planner 117 may represent respective mutually exclusive conditional evolutions of the "world" from the perspective of the vehicle in the depicted embodiment—where the "world" comprises at least the position, orientation and velocity of the vehicle 110, together with representations of a dynamically changing pertinent set of other entities in the vehicle's external environment (including aspects of road topology). The behavior planner 117 may also be responsible for determining (e.g., based on sensor data, models for dealing with incomplete or partially observable views of the external environment, etc.) exactly which external entities should be considered pertinent for a given policy in the depicted embodiment.

In various embodiments, in order to generate a given policy, the behavior planner 117 may utilize a statistical distribution of a particular set of (typically, but not necessarily mutually exclusive) actions taken by one or more vehicle controlling entities (e.g., human or simulated drivers) under a given condition or state. For example, a database representing actual driving decisions made in the past by human drivers may be analyzed. Individual records of the database may include data which indicates the state of the vehicle (e.g., the logical equivalent of something like "driving a sedan S at 60 miles/hour in the middle lane of a three-lane highway, approaching a truck T which appears to be moving at approximately 50 miles an hour in the same lane in the same direction"), and the actual driving actions taken by different drivers (e.g., the logical equivalent of something like "moved to the left lane, accelerated to 70 miles/hour temporarily to pass the truck T" or "moved to the left lane, did not change speed", "stayed in middle lane, slowed down to 50 miles/hour", etc.). Using the probability distributions of several different actions taken by real drivers in similar situations to the autonomous vehicle's current or anticipated state, a set of alternative mutually exclusive actions may be identified. Thus, for example, with respect to a pair of policies P1 and P2, each of which includes a vehicle state S, action A1 may be included in policy P1 based on analysis of statistical distributions of real-world driving decisions, and a mutually exclusive (with respect to A1) action A2 may be included in policy P2. Unlike in some approaches to autonomous navigation, in which a single "optimal" plan may be chosen for implementation, several alternative policies or {a, s} sequences may be provided for consideration by the motion selector 118 in the depicted embodiment. In at least some embodiments, simulations of driving behavior may be run and used to arrive at the statistical distributions, e.g., in addition to or instead of using real-world driving data.

Before providing a given {a, s} sequence to the motion selector, in at least one embodiment the acceptability of the proposed sequence may be verified by behavior planner 117. The acceptance criteria used may include, for example, whether the plan is likely to lead to a timely arrival at a targeted destination of the journey being undertaken, whether the plan is dynamically feasible, whether applicable traffic rules are followed in the plan, and/or whether the proposed plan is likely to lead to a comfortable transportation experience for vehicle occupants. One or more reward functions and/or value functions (which may recursively aggregate rewards for several states or actions of a proposed {a, s} sequence) may be used to compare alternative policies in different embodiments based on quantitative assessments of similar factors. Rewards and/or value functions may also take social interactions into account in at least some embodiments—e.g., if a particular action A1 (such as suddenly switching a lane to move in front of another vehicle, or passing a bicycle with a very small clearance) is likely to induce negative feelings or negative social reactions among individuals outside (or inside) the vehicle, a policy which contains action A1 may be assigned a lower value than a policy which excludes A1 (all other factors being equal).

Figure 2:
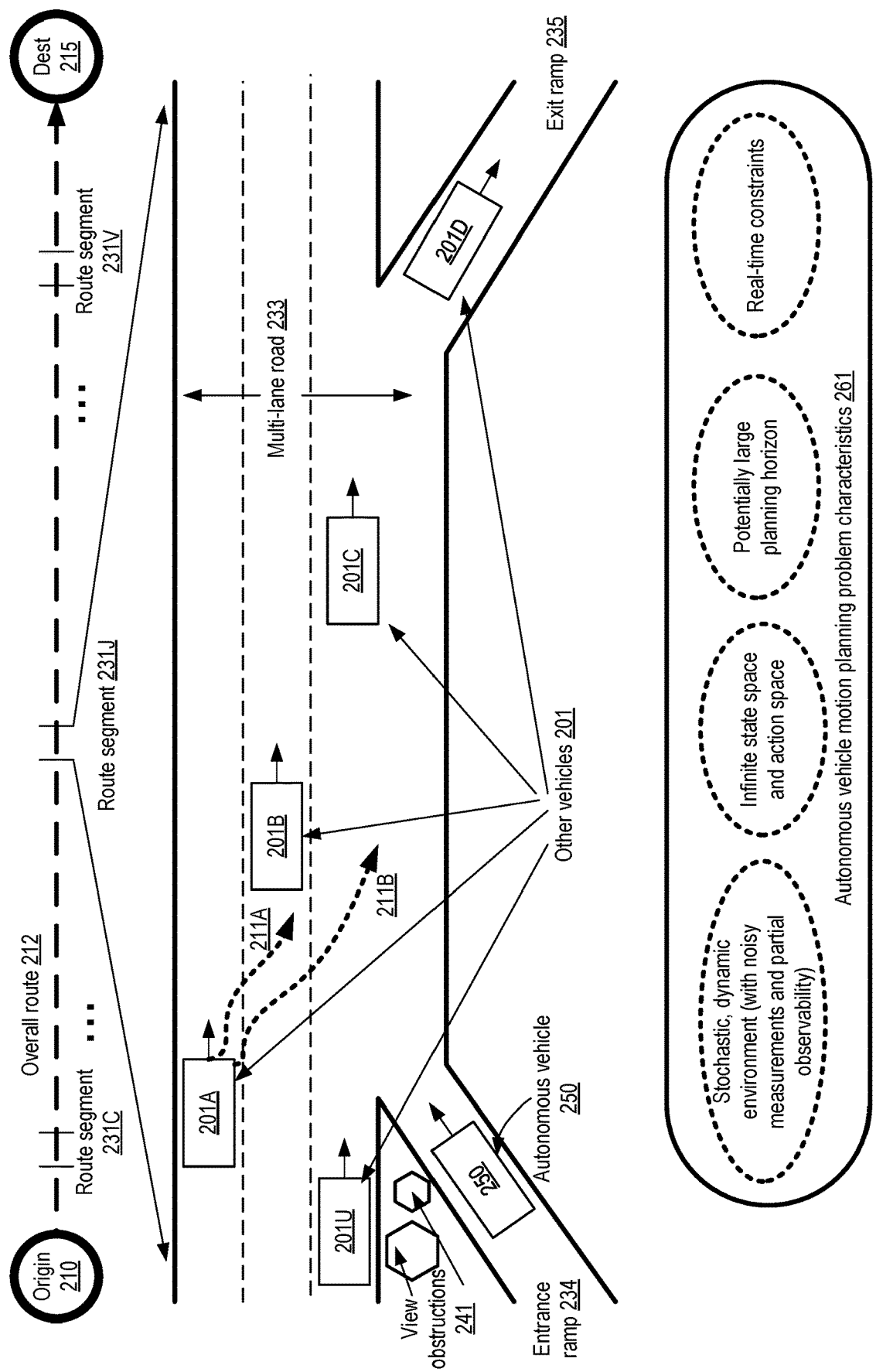
FIG. 2 illustrates an example decision making scenario for an autonomous vehicle, as well as general problem characteristics associated with such decision making scenarios, according to at least some embodiments.

FIG. 2 illustrates an example decision making scenario for an autonomous vehicle, as well as general problem characteristics associated with such decision making scenarios, according to at least some embodiments. A high-level overall route 212 for an autonomous vehicle 250 from an origin 210 to a destination 215 (labeled "Dest" in FIG. 2) may be identified prior to the start of a journey. The high-level route 212 may, for example, be identified using a network-accessible mapping service, and may comprise information such as a proposed set of highways/roads, the exits and entrances to be used for the highways/roads, and so on. In some cases the high-level route 212 may also comprise an estimated or targeted arrival time at the destination 215. The route 212 may comprise numerous subportions or segments 231, such as segments 231C, 231J and 231V. A given segment 231 may represent, for example, an entrance or turn onto some road or highway, some driving distance on the road or highway, and so on.

In the depicted example, route segment 213J comprises the use of an entrance ramp 234 by autonomous vehicle to merge into a multi-lane road 233 (the dashed lines indicate lane boundaries). An exit ramp 235 is located within a short distance of the entrance ramp 234 in the example. A number of other vehicles 201 (of which zero or more may be autonomous vehicles), such as vehicles 201A, 201B, 201C, 201D and 201U may be using the road 233 at or just before vehicle 250 is to enter the road, and may be close enough to the entrance ramp to be considered pertinent to the motion decisions made for vehicle 250. The general directions of motion of the vehicles 201 and 250 are indicated by the arrows—e.g., most of the vehicles shown are assumed to be generally proceeding from left to right in the view shown in FIG. 2. The decisions which need to be made with respect to autonomous vehicle 250 may include, for example, the speed at which the road should be entered, how long the vehicle 250 should remain in any given lane immediately after entering the road, whether and to what extent the vehicle's speed should be changed after the entrance, and so on.

Although experienced human drivers may find these kinds of decisions fairly straightforward to make, the task of automating such decisions in a timely and safe manner may be complicated. The general problem of making motion-related decisions for the autonomous vehicle may be summarized as follows. Given some level of understanding or knowledge about the "world" (the nearby environment of the vehicle 250, as well as the properties of the vehicle's current position and movements), and given information about the destination 215 (including the high-level route 212), the decision making components of the vehicle 250 may be required to produce a sequence of trajectories for the vehicle that (a) arrive at the destination safely in a timely and efficient manner (e.g., meeting some desired fuel or battery usage targets), (b) are dynamically feasible (e.g., comply with various applicable physical laws), (c) follow traffic rules, and (d) provide a comfortable experience for the vehicle's occupants.

A number of problem characteristics 261 which tend to make the decision making for autonomous vehicles challenging are indicated in FIG. 2. First, the dynamically changing environment of vehicle 250 may be inherently stochastic rather than deterministic, with noisy rather than full and accurate data (such as velocity, position, or heading) available with respect to other vehicles 201 and other relevant objects (such as debris in the road, potholes, signs, etc.). In some cases, one or more objects 241 may partially block a view of the road. As a result, one or more vehicles such as 201U may be partially or fully unobserved during the time period in which the merge-related decisions for vehicle 250 may have to be made. Furthermore, the intentions or goals of other agents (e.g., the drivers of vehicles 201, or the decision making components of those vehicles 201 which happen to be automated vehicles) may be unknown and difficult to predict. For example, even if the current position and velocity of vehicle 201A is known, the agent controlling vehicle 201A may suddenly change vehicle 201A's trajectory to a different lane, as indicated by arrows 211A and 211B, and such a transition may affect the decisions made on behalf of autonomous vehicle 250. Second, many of the metrics or observations which may need to be considered when making the decisions, such as the velocities and relative distances between various vehicles, may take on continuous rather than discrete values, resulting in a theoretically infinite feasible space of possible states and actions.

The number of sequential actions which may need to be planned may be quite large, resulting in potentially large planning horizons. In principle, to achieve optimal decisions (where the definition of optimality may itself be non-trivial), individual actions and corresponding achievable states may have to be evaluated relative to one another with respect to the goals of the journey, and such comparisons may become computationally intractable depending on the number of alternatives being considered at each stage. Finally, because the vehicle 250 is moving, with a high (and therefore potentially dangerous) level of kinetic energy, the decisions may have to be made within tight real-time constraints, using limited computational resources. These characteristics, taken together, may make motion planning for autonomous vehicles an extremely difficult proposition, which may require a variety of different types of algorithms to be utilized in combination as discussed below.

Figure 3:
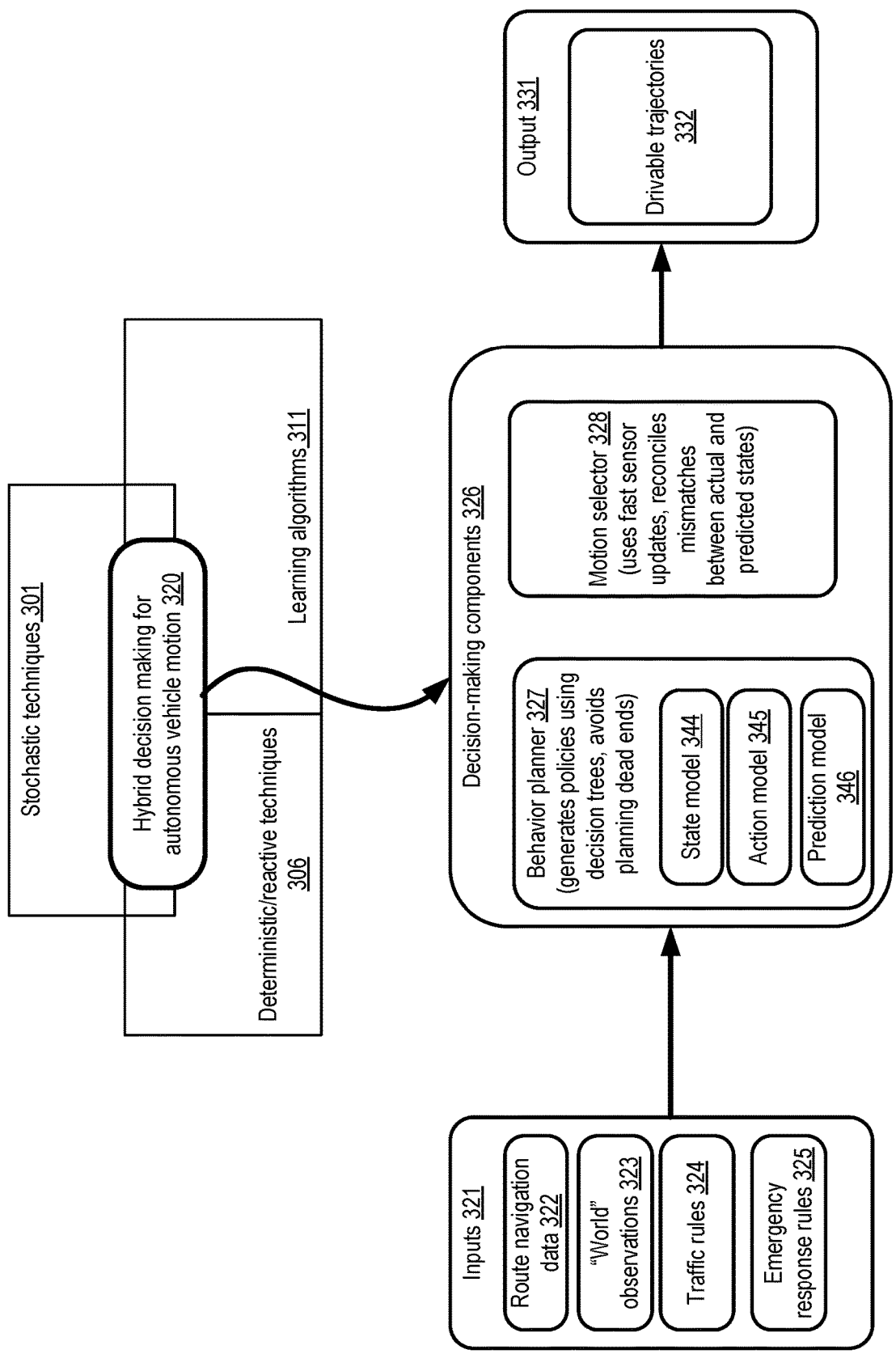
FIG. 3 provides an overview of a hybrid approach towards decision making for autonomous vehicles, which involves a combination of stochastic, deterministic and learning-based techniques, according to at least some embodiments.

FIG. 3 provides an overview of a hybrid approach towards decision making for autonomous vehicles, which involves a combination of stochastic, deterministic and learning-based techniques, according to at least some embodiments. As discussed below in further detail, a stochastic approach which takes conditional probabilities of attaining respective next-states given the current state and a selected action may be used to construct decision trees by the behavior planner 327 as part of the hybrid approach 320. Deterministic/reactive approaches 326, which by definition tend to avoid uncertainty, may be used to simplify certain decisions which have to be made extremely rapidly, as in the case of various types of emergency scenarios governed by emergency response rules 325. Furthermore, deterministic techniques may also be used to react to unpredicted events in various embodiments. Because of the inherent unpredictability of the environment, deterministic algorithms for motion selection may not be relied upon exclusively, as they may sometimes lead to planning dead-ends in which no reasonable options remain available to meet the journey's goals. Other deterministic-only approaches may involve pessimistic assumptions which result in overly timid trajectories (e.g., implementing plans which attempt to take all possible problem scenarios into account may lead to extremely slow and therefore undesirable journeys). Finally, machine learning algorithms 311 may be used to learn relationships (e.g., between states and actions) that are hard to encode manually, and/or to optimize aspects of the stochastic and/or deterministic techniques used in the hybrid decision-making approach. The reduction in computational costs which has occurred in recent years may make implementing stochastic techniques as well as machine learning algorithms more feasible, as the amount of computation required may be substantial. For some combinations of algorithms and parameters, for example, on-board computing resources of the vehicle may suffice.

The inputs 321 of the hybrid decision making methodology may include, for example, route navigation data 322 (e.g., highways, roads, turns, etc.), observations 323 of the "world" (the autonomous vehicle itself, as well as its surroundings, obtained using various sensors and/or communication devices of the autonomous vehicle), traffic rules and laws 324, as well as a set of emergency response rules 325 (such as "move off the road with speed S if a vehicle approaches within M meters at a relative velocity of R kilometers per hour"). The behavior planner 327 of the decision-making components 326 may construct a number of models to represent and make predictions regarding the world and the associated uncertainties, given the incomplete data available. The models may include a state model 344, representing for example the joint positions, velocities, accelerations etc. of various agents (such as drivers or decision-making components of other vehicles). An action model 345 may be constructed to represent a desired behavior over a short-term horizon (e.g., a lane change, maintenance of current speed, acceleration to some target speed). Only a selected subset of representative actions which meet certain criteria may be considered when generating the policies in the depicted embodiment. A prediction model 345 may provide a probability distribution over some number of next-states, given the current state and the alternative actions being considered. Using such models, which may in some cases involve the use of machine learning techniques as discussed below, the behavior planner may generate a set of one or more policies ({action, state} sequences), evaluate them and provide at least a recommended subset of the policies to the motion selector 328 in the depicted embodiment.

The motion selector 328 may make finer-granularity decisions to generate, as the output 331 of the decision-making components, drivable trajectories 332. These finer-granularity decisions may be made on the basis of the policies provided by the behavior planner, sensor data collected more frequently than the sensor data collected by the behavior planner, and (in some cases) emergency response rules 325 in the depicted embodiment. Among other responsibilities, the motion selector 328 may reconcile mismatches between states predicted in the policies and actual (observed) states, and smooth out trajectories which may have been provided by the behavior planner to achieve more comfortable rides for vehicle occupants. In some embodiments, the output of the decision-making components may include records comprising an indication of at least some of the reasoning used to obtain the drivable trajectories 332; such records may, for example, be analyzed offline to improve the quality of decision making over time.

Figure 4:
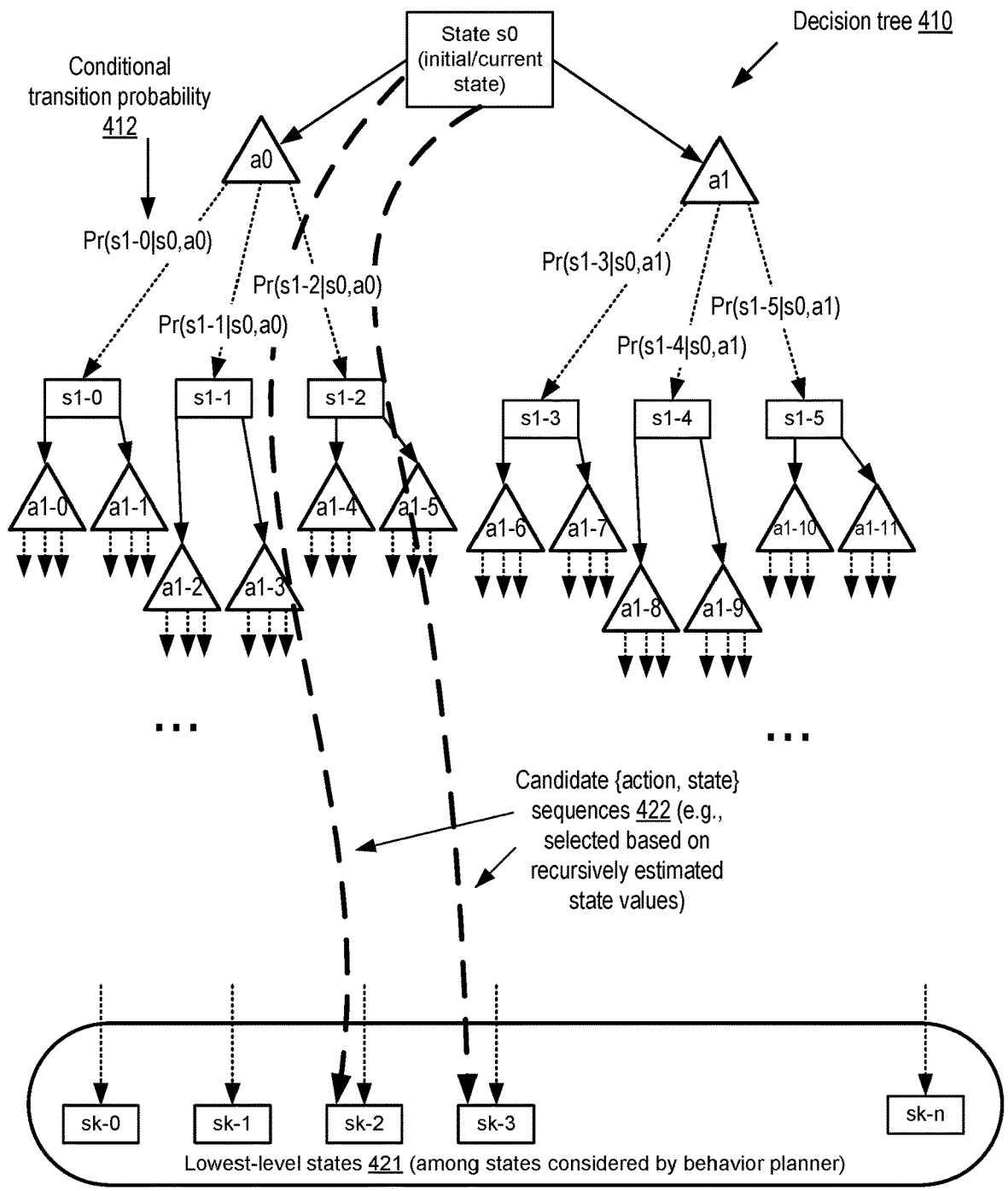
FIG. 4 illustrates an example decision tree from which policies comprising candidate action and state sequences may be selected for transmission from a behavior planner to a motion selector, according to at least some embodiments.

FIG. 4 illustrates an example decision tree from which policies comprising candidate action and state sequences may be selected for transmission from a behavior planner to a motion selector, according to at least some embodiments. Decision tree 410 may comprise two types of nodes in the depicted embodiment: state nodes (with labels such as s0, s1-0, etc.), and action nodes (with labels such as a0, a1-0, etc.). At a given point of time at which decision tree 410 is being constructed by a behavior planner, the current or initial state of the autonomous vehicle's world may be represented by the node labeled s0. A number of actions may be feasible from the initial state, each of which may lead to one of several next states with respective transition probabilities. That is, the edges between a source state and other "next-states" which may result from the implementation of an action may each indicate the probability of reaching that state, given the source state and the action. To reduce clutter, a trivial example in which each two actions are considered for each state, and in which each action may result in one of three next states, is shown in FIG. 4. In real-world scenarios, the respective fan-outs from state nodes and action nodes may be significantly different (e.g., greater) than those shown in FIG. 4. Furthermore, in at least some embodiments, the fan outs may differ for different state nodes, for different action nodes, or at different levels within the tree. The fan-outs, as well as the number of levels of the decision tree, may be considered tunable or optimizable parameters of the decision-making procedure in various embodiments.

A traversal down the tree from the root node s0 to one of the lowest-level states 421 (sk-0, sk-1, sk-n) for which decision-making is being performed forms a candidate sequence (such as one of the pair of sequences labeled 422) of conditional actions and states which may be selected for transmission to a motion selector. Consider, for example, the set of possible next states included in tree 410 if action a0 is implemented from initial state s0. The notation Pr(s1-0|s0, a0) represents the conditional transition probability 411 of reaching state s1-0, given starting state s0 and action a0. Similarly, Pr(s1-1|s0, a0) represents the probability of reaching state s1-1, given starting state s0 and action a0, and so on. Depending on the planning horizon (which corresponds roughly to the depth of tree 410, that is, the number of levels between s0 and lowest-level states 421) and the fan-outs from the action and state nodes, the total amount of computation required for constructing a complete decision tree may be quite high in various embodiments. The behavior planner may use several types of optimizations when constructing decision trees such as 410 and when evaluating action and state sequences relative to one another in various embodiments. In some embodiments, values associated with various states may be estimated using a recursive technique (involving the use of local reward functions indicative of the relative suitability of different states) as discussed below to select the candidate sequence or sequences to be provided to the motion selector. Monte Carlo search tree algorithms may be utilized, e.g., together with neural networks trained to limit tree search with respect to breadth and depth, in some embodiments as also discussed below.

Figure 5:
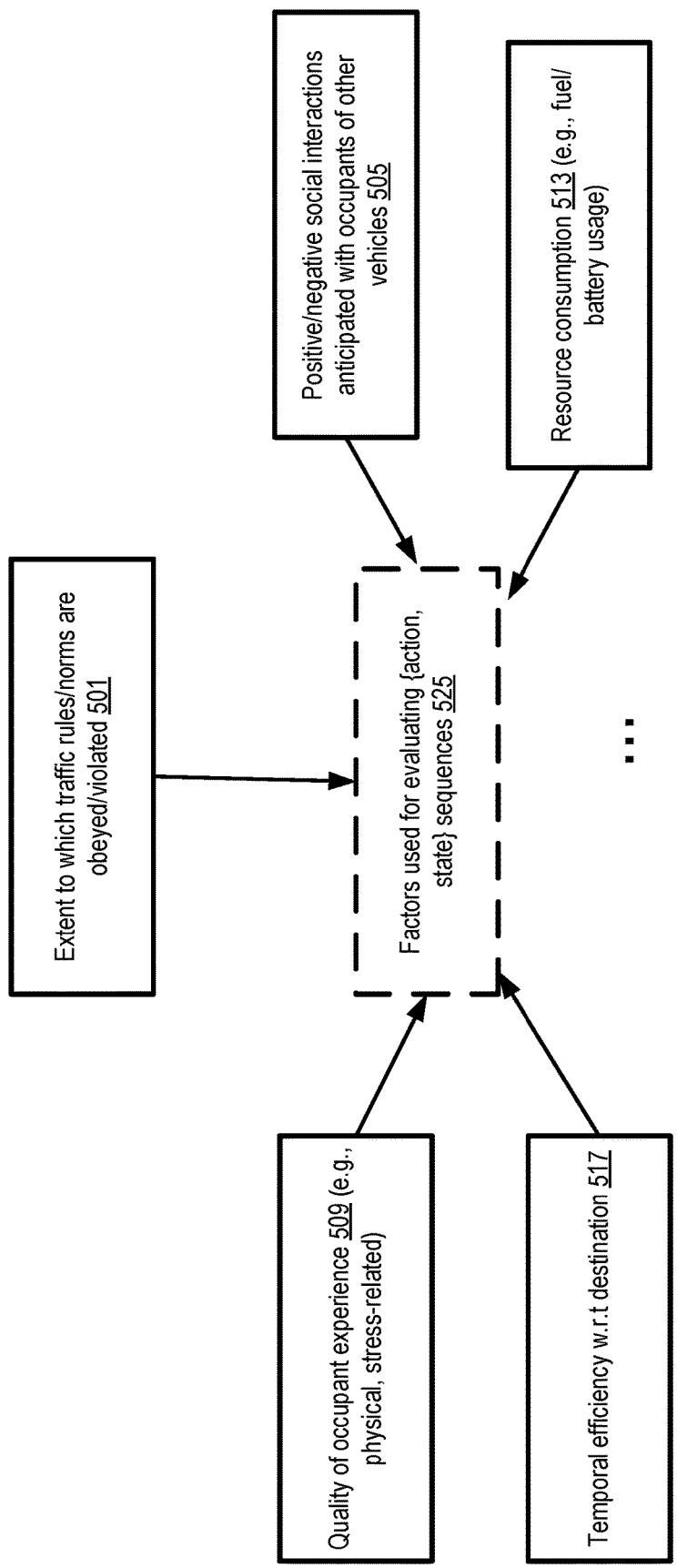
FIG. 5 illustrates example factors which may be used for evaluating policies, according to at least some embodiments.

FIG. 5 illustrates example factors which may be used for evaluating policies, according to at least some embodiments. A recursive evaluation procedure may be used in some embodiments. In such a procedure, a reward $R(s_i, a_j, s_{i+1})$ associated with individual transitions from each state $s_i$ to state $s_{i+1}$, where the transition is a result of implementing some action $a_j$, may be computed in a traversal down the decision tree. Then, then the respective rewards for the transitions of a given {action, state} sequence may be aggregated during a traversal back up the tree to obtain a value for the sequence as a whole. Because the transitions have conditional probabilities associated with them as discussed above, the value associated with a given sequence may be represented probabilistically rather than deterministically. In at least one embodiment, the plurality of policies which are generated at a behavior planner with respect to a given initial state may be ranked relative to one another based on their estimated values, and only a subset of the policies which meet a minimum value criterion may be passed on to the motion selector.

When determining the reward associated with a given transition, numerous factors may be taken into account in the depicted embodiment. In addition to temporal efficiency 517 (i.e., how soon the destination is likely to be reached if a given set of actions is implemented), factors 525 which may be used collectively to determine rewards and hence policy values may include the quality of the occupants' experience 509, the extent to which traffic rules or norms are obeyed 501, social interactions 505 and resource consumption 513. A set of assumptions about occupant preferences and psychology may guide the way in which the factors are quantified to arrive at a numerical reward or value: for example, with respect to occupant experience, an action sequence which results in fewer lane changes, fewer periods of rapid accelerations and slowdowns, etc., may be considered superior to a plan which involves four lane changes within a minute with quick speed changes. A sequence which violates even a minor traffic rule or norm (e.g., that a turn signal should be activated at least T seconds before a turn is performed, or that a lane divider consisting of a solid white line should not be crossed) may be considered inferior in value to a sequence in which no traffic rules or norms are violated.

In some cases the value associated with an {action, state} sequence may incorporate representations of anticipated social interactions 505 (e.g., with occupants/drivers of other vehicles). For example, changing a lane before a required exit may contribute positively to the value of a sequence. However, if the timing of the change and the proximity to another vehicle in the destination lane is such that it results in an apparent rude "cutting off" the other vehicle, the occupants of the other vehicle may not react very positively, so the value of the sequence may be reduced due to potential negative social interactions which may result. Of course, social interactions and expectations may have to be evaluated in cultural or geographical context—e.g., a particular action that causes an extremely negative social response in one country may be considered less offensive in another country. Resource consumption 525—e.g., the extent to which gasoline or a battery of an electric or hybrid vehicle is consumed as a result of a particular sequence relative to other sequences—may also be incorporated within reward/value calculations in some embodiments. Environmental implications (such as carbon footprint) may also be included in reward/value estimations in some embodiments. Respective customized weights may be assigned to the different factors in some embodiments, based on the preferences of the vehicle's owners and/or occupants—e.g., some vehicle occupants may direct the decision-making elements of the vehicle to assign higher weights to environmental or resource consumption factors than occupants of other vehicles. In some embodiments, the manner in which the various factors used in evaluation are quantified (e.g., exactly how specific motions are translated into metrics with respect to comfort, stress, etc., which motions are to be ignored and which are to be included in the reward/value calculations) may comprise parameters of the decision-making algorithm, which may themselves be tuned over time using machine learning or other techniques.

Equations similar to the equations 551, 552, and 553 shown in FIG. 5 may be used in some embodiments for the computation of rewards and values, and for selecting (from among a group of policies) the optimum policy which has the highest value. Using equation 551, the overall reward associated with a given state and action R(s,a) may be calculated using the conditional transitional probabilities (Pr(s'|s,a)) for the set of next states reachable as a result of action "a". The symbol "π" is used to denote a policy ({action, state} sequence) in equations 552 and 553, $V^\pi(s)$ represents the value associated with a state s when executing policy π (which includes actions $a_\pi$). Equation 553 indicates that the particular combination of sequential actions and states which maximizes (hence the use of the argmax operator) the value determined using equation 552 represents the optimum policy among the policies being considered. As mentioned earlier, in various embodiments, more than one policy or {action, state} sequence may be selected as a candidate for transmission to the motion selector in various embodiments—thus, even though equation 553 indicates how the optimum policy can be identified, this is not meant to imply that only the single optimum policy is provided to the motion selector. Instead, for example, several policies that have values reasonably close to the optimum may be provided.

Figure 6:
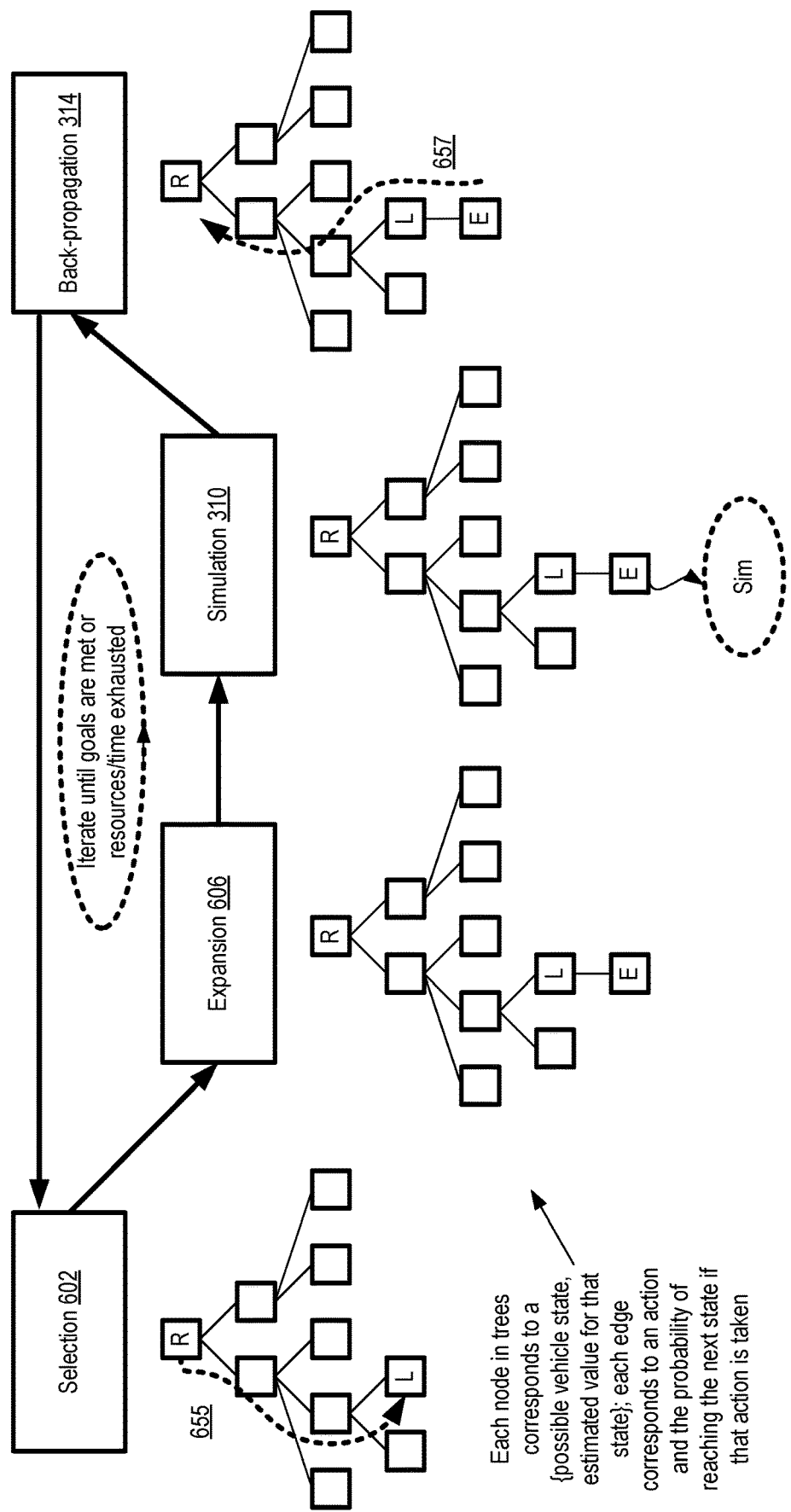
FIG. 6 illustrates an overview of Monte Carlo Tree Search (MCTS) algorithms which may be adapted for planning autonomous vehicle trajectories, according to at least some embodiments.

As mentioned earlier, tree search-based algorithms may be used at the decision making components of autonomous vehicles in various embodiments. FIG. 6 illustrates an overview of Monte Carlo Tree Search (MCTS) algorithms which may be adapted to generate action sequences for autonomous vehicles, according to at least some embodiments. At a high level, a basic MCTS algorithm such as that shown in FIG. 6 may comprise a plurality of iterations or loops, with each iteration including a leaf node selection phase 602, a tree expansion phase 604, a simulation phase 606 and a back-propagation phase 614. A tree may comprise a plurality of nodes and a plurality of edges. Generally speaking, each node may correspond to a state, and each edge may correspond to an action that results in a transition from one state to a different state. (For autonomous vehicle motion planning, the basic MCTS algorithm may be adapted such that an edge from a given s1 to a different state s2 of a tree represents a probability that a given action leads to the state s2 from state s1—e.g., edges may represent transition probabilities rather than unconditional actions per se.) A single "action" corresponding to one edge in a tree may actually correspond to a combination of several different motion-causing directives in the context of autonomous vehicles in some embodiments. In various embodiments, in addition to state information, the metadata stored for individual nodes may include a respective estimated value for the node (computed for example using a neural network as discussed below) and/or a visit count indicating how often the node has been encountered thus far in the execution of the algorithm.

The root node (designated by the letter R in FIG. 6) may correspond, for example to an initial state (e.g., the current state) with respect to which decisions regarding actions are to be made. Starting at the root node, in one embodiment, "optimal" child nodes may recursively be identified at each level of the tree in the leaf-node selection phase 602 until a leaf node (designated by the letter L) is reached. For example, in one straightforward implementation of MCTS (which may be modified for use in the autonomous vehicle context), an Upper Confidence Bounds (UCB) formula may be used to select child nodes. According to this formula, the following quantity $q_i$ may be computed for the $i^{th}$ child node:

$$q_i = v_i + C\sqrt{\frac{\ln N}{n_i}}$$

In the formula shown, vi is the value estimated for the $i^{th}$ child node, C is a bias constant, N is the number of times that the parent of the $i^{th}$ child node has been visited thus far, and $n_i$ is the number of times that the $i^{th}$ child node itself has been visited. At each level, the child node with the highest $q_i$ may be selected, and a path 655 towards an "optimal" leaf level node L may thereby be built. The UCB formula has been shown to provide a reasonable balance between the exploitation of known rewards and the exploration of as-yet-unvisited nodes for various use cases.

In the expansion phase 604, one or more new nodes (such as the expansion node E in FIG. 6) may be added as children nodes of L, based on the feasible actions identified by the decision-making system being used. Next, in the simulation phase 606, a simulation (indicated by the label "Sim" in FIG. 6) of possible states which may be reached from the newlyadded node E may be run. Depending on the application for which the MCTS technique is being employed, the simulation may be run up to different tree depths. For example, when MCTS is being used to make game-playing decisions for some games which have reasonably small sets of feasible actions at each state, the simulation may be run until a game termination state (e.g., victory, defeat, or a draw) is reached. When MCTS is being used for autonomous vehicle movement decisions, or for games with a much wider array of possible actions, a simulation depth may be selected as a parameter of the algorithm, since a comprehensive simulation may be impracticable (or, in the case of the variety of continuous values which contribute to states in the vehicle scenario, impossible). In the back-propagation phase 610, the results of the simulations (which may include, for example, values for various states attained in the simulations with respective probabilities) may be propagated up the tree, e.g., along pathway 657, updating per-node values and visit counts as needed. The next iteration's phases may then be begun, unless resources designated for action selection have been exhausted or the time allocated for the action selection has been exhausted. If and when the time/resources are exhausted, at least one of the optimal paths identified to leaf nodes may be used to initiate the corresponding actions. In a variant of MCTS used for autonomous vehicles, several different paths (the optimal path and one or more near-optimal paths) may be used to generate respective behavior plans, and provided as input to the motion selector in some embodiments.

Generally speaking, MCTS algorithms similar to that shown in FIG. 6 may have the advantages that they can be applied to a variety of domains (games, vehicle navigation, etc.), that the tree growth and search is asymmetrically biased towards "more interesting" nodes (e.g., nodes with higher rewards/values), that the algorithms can be exited gracefully at any time at least from the computational perspective (with the current results being stored), and that the algorithms are conceptually simple. Of course, as the combinatorial space of feasible actions and reachable states grows, the computational resources required for executing the basic MCTS algorithms to cover all the alternatives may become impracticably large.

The core MCTS algorithms may be enhanced (e.g., to apply heuristics which may limit searches in several ways) using neural network models in some embodiments to enable autonomous vehicle-related decisions to be made in a timely manner. Using such models, learned search bias—that is, limiting searches in a decision tree by attempting to identify "better" or "more useful" actions based on real and/or simulated driver experience—may be introduced into the decision-making process. Since predictions far into the future are typically less accurate than near-term predictions, the depth to which the trees are constructed during a given iteration of behavior planner operations may be reduced in various embodiments using an approach termed variable resolution tree growth. Navigation-related information obtained from external sources (e.g., current traffic estimates for various segments of the route, and/or historical traffic records) may also be used, together with an estimate of the remaining time to reach the destination, to reduce tree depth. For example, in one embodiment, the planning horizon may be set to approximately 30 seconds, which may result in a tree depth of approximately 10 actions to be considered, assuming each action corresponds to approximately 3 seconds.

Figure 7:
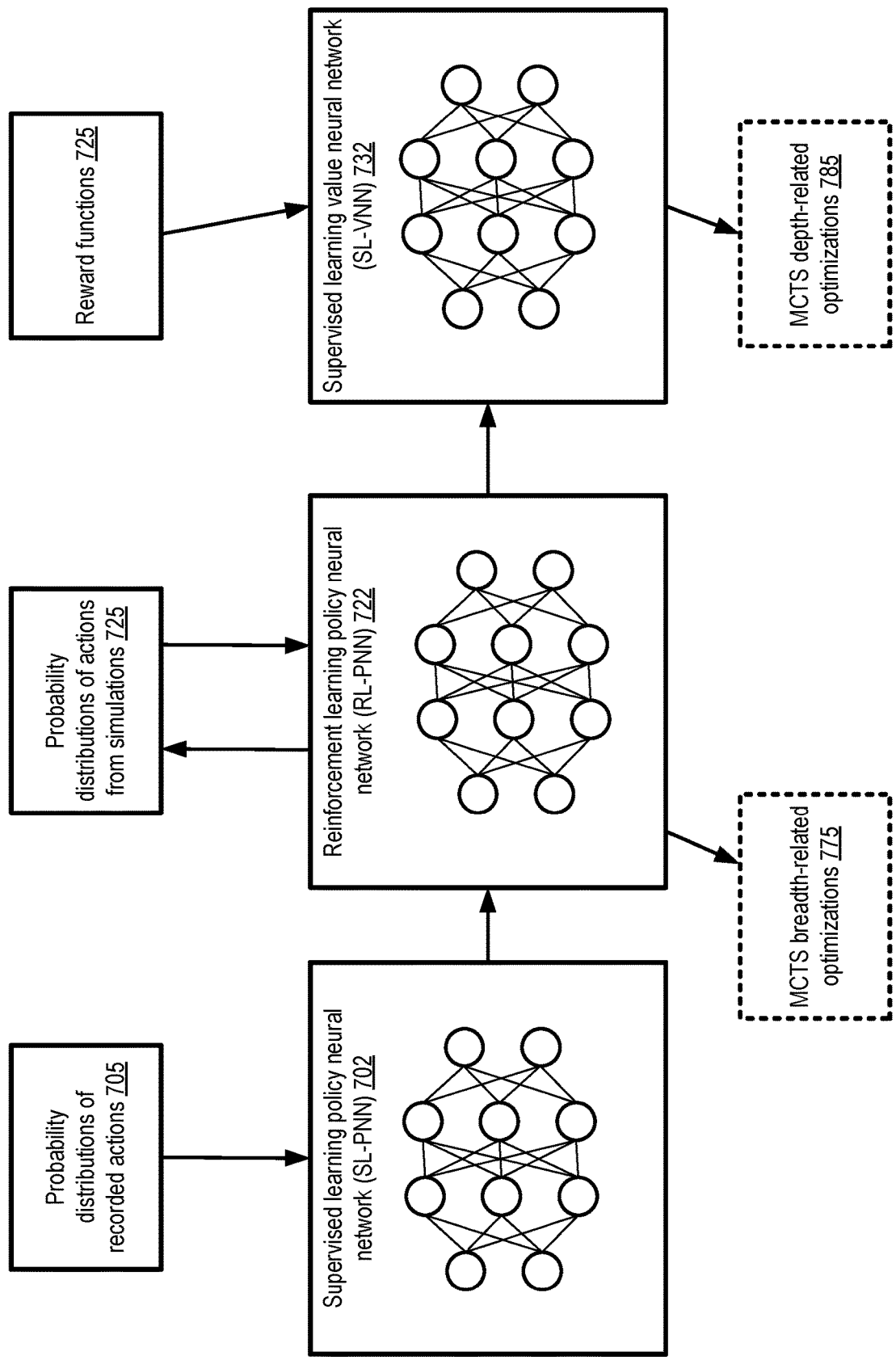
FIG. 7 illustrates an overview of neural network models which may be used to optimize tree search operations for autonomous vehicle motion control, according to at least some embodiments.

FIG. 7 illustrates an overview of neural network models which may be used to optimize tree search operations for autonomous vehicle motion control, according to at least some embodiments. Three neural networks are shown by way of example: a supervised learning policy neural network (SL-PNN) 702, a reinforcement learning policy neural network (RL-PNN) 722, and a supervised learning value neural network (SL-VNN) 732.

In the depicted embodiment, probability distributions of recorded (actual) actions 705 (and the results or rewards of those actions) may be used as input to train the SL-PNN. The actual actions may include, for example, actions taken by human drivers and/or actions taken by autonomous vehicle decision components in realistic environments. The RL-PNN may, for example, be initialized as a copy of the SL-PNN, and may be enhanced by performing simulations (e.g., simulations representing unlikely states than were not likely to be captured in real driver recordings). The reinforcement learning phase of the analysis may be considered analogous to self-play in game-playing computer programs, in which the computer plays the game against itself, and learns from the results of such games. The probability distributions of actions performed in the simulations 725 may be used together with the probability distributions of recorded driver actions to help limit Monte Carlo tree searches along the breadth dimension (i.e., to limit the number of child nodes examined at a given level of the tree), as indicated by element 775. For example, from among the set of N alternative feasible actions which can be taken from a given state, the top K actions which occurred most frequently and also led to meeting journey objectives (and hence may be considered the most "promising" actions) in the simulations may be considered candidates for further analysis. The SL-VNN may be used (as indicated by element 785) to help limit the depths to which searches are conducted within a Monte Carlo tree, e.g., by assigning values to states (from among the states resulting from promising actions identified using the RL-PNN) occurring up to a limited depth. In some embodiments, deep CNNs (convolutional neural networks) with numerous hidden layers may be used at one or more of the stages of the pipeline shown in FIG. 7.

Figure 8:
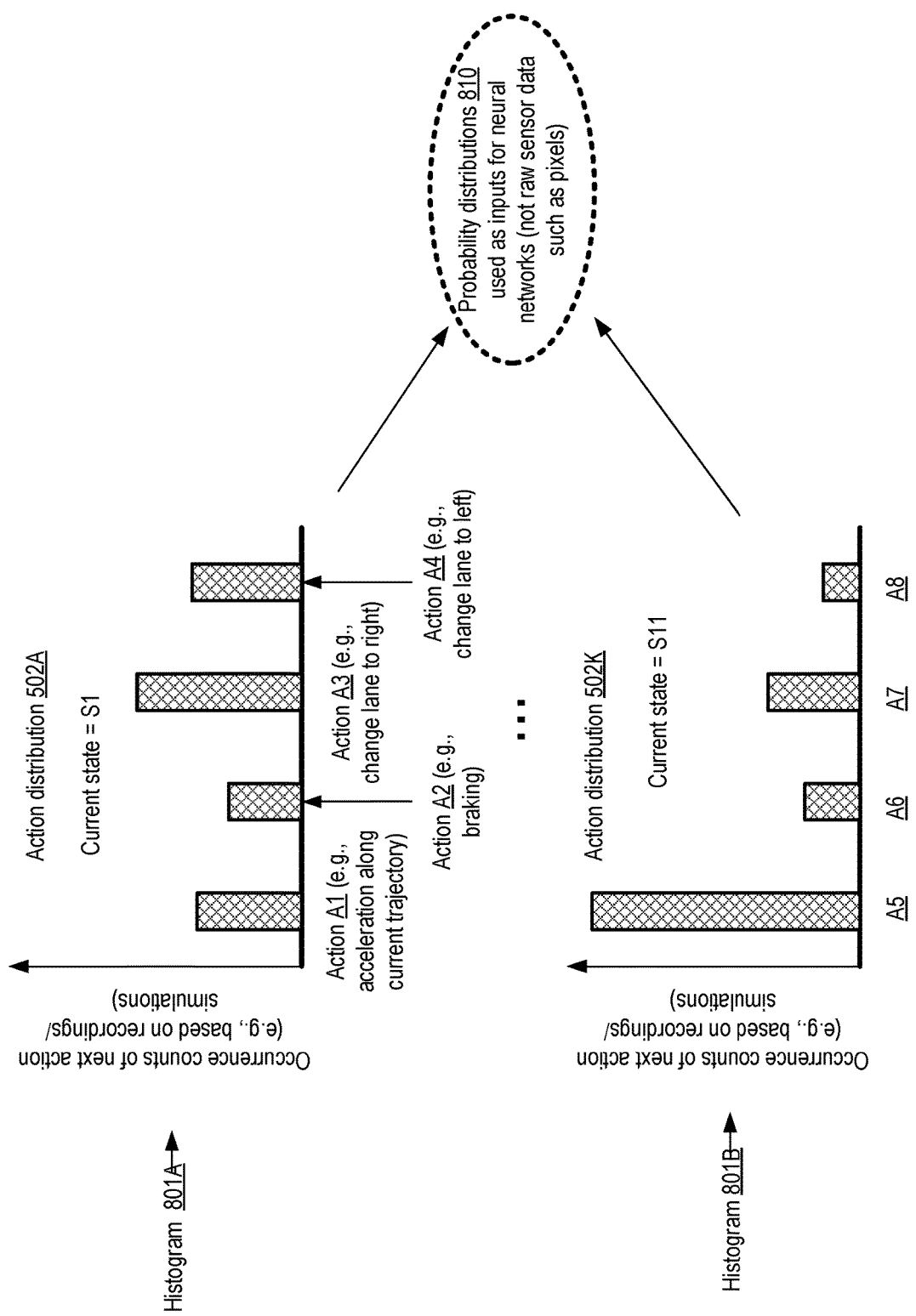
FIG. 8 illustrates examples of action distributions which may be used by behavior planners for autonomous vehicles, according to at least some embodiments.

As mentioned earlier, statistical distributions of actions taken earlier in various states (e.g., by human drivers, by decision making components of other autonomous vehicles, or by simulated drivers) may be used to plan the movements of autonomous vehicles in various embodiments. FIG. 8 illustrates examples of action distributions which may be used to generate action sequences for autonomous vehicles, according to at least some embodiments. In the upper histogram 801A, the relative number of times each of four example feasible and mutually exclusive actions A1, A2, A3 and A4 were taken in a particular state S1 is illustrated, with the heights of the respective bars for the four actions being proportional to the number of times the corresponding action was taken. Action A1 corresponds to accelerating the vehicle without changing direction in the depicted example, A2 corresponds to braking, A3 corresponds to changing a lane to the right of the current lane, and action A4 corresponds to changing a lane to the left. Among these four example actions, A3 was chosen most frequently, with A4 second and A1 third, based on the recorded data collected and/or on simulations.

When the decision making system of the vehicle encounters a state similar to S1 (or when a state similar to S1 is one of the anticipated states being considered as a possibility in a policy being generated), the distribution of the actions A1-A4 may be taken into consideration to generate the policies. For example, in one implementation, at least two alternative policies (involving actions taken if/when state S1 or its equivalent is reached) may be generated—one involving action A3, and another involving action A4. In such an implementation, both the alternatives may be provided by the behavior planner to the motion selector. Similarly, if and when a state S11 is reached or anticipated, the distribution of the feasible actions A5, A6, A7 and A8 shown in histogram 802 may be analyzed to generate policies. If two alternative policies are to be generated, for example, A5 and A7 may be selected as the actions taken in state S11. Given the large difference in occurrence count between the most commonly-performed action (A5) and the next-most-common action A7, in at least some cases only policies that involve performing A5 from state S11 may be generated—that is, even if the behavior planner may have been programmed to normally generate at least two policies involving alternative actions from a given state by default, the default may be overridden if one of the actions has been empirically shown to be much more popular than any of the other actions.

In embodiments in which neural networks of the kind discussed above are utilized, the inputs to at least some of the neural networks may comprise world state probability distributions 810 corresponding to statistical distributions such as those shown in FIG. 8, rather than raw sensor data (such as pixels captured via one or more cameras). As discussed above, the number of alternative actions which may have been taken in a given state may be quite large in the context of autonomous vehicles. Instead of constructing a complete histogram indicating the distribution of the actions (which may include histogram buckets for a number of rarely implemented actions), in at least some embodiments a partial histogram may be used as an approximate distribution.

Figure 9:
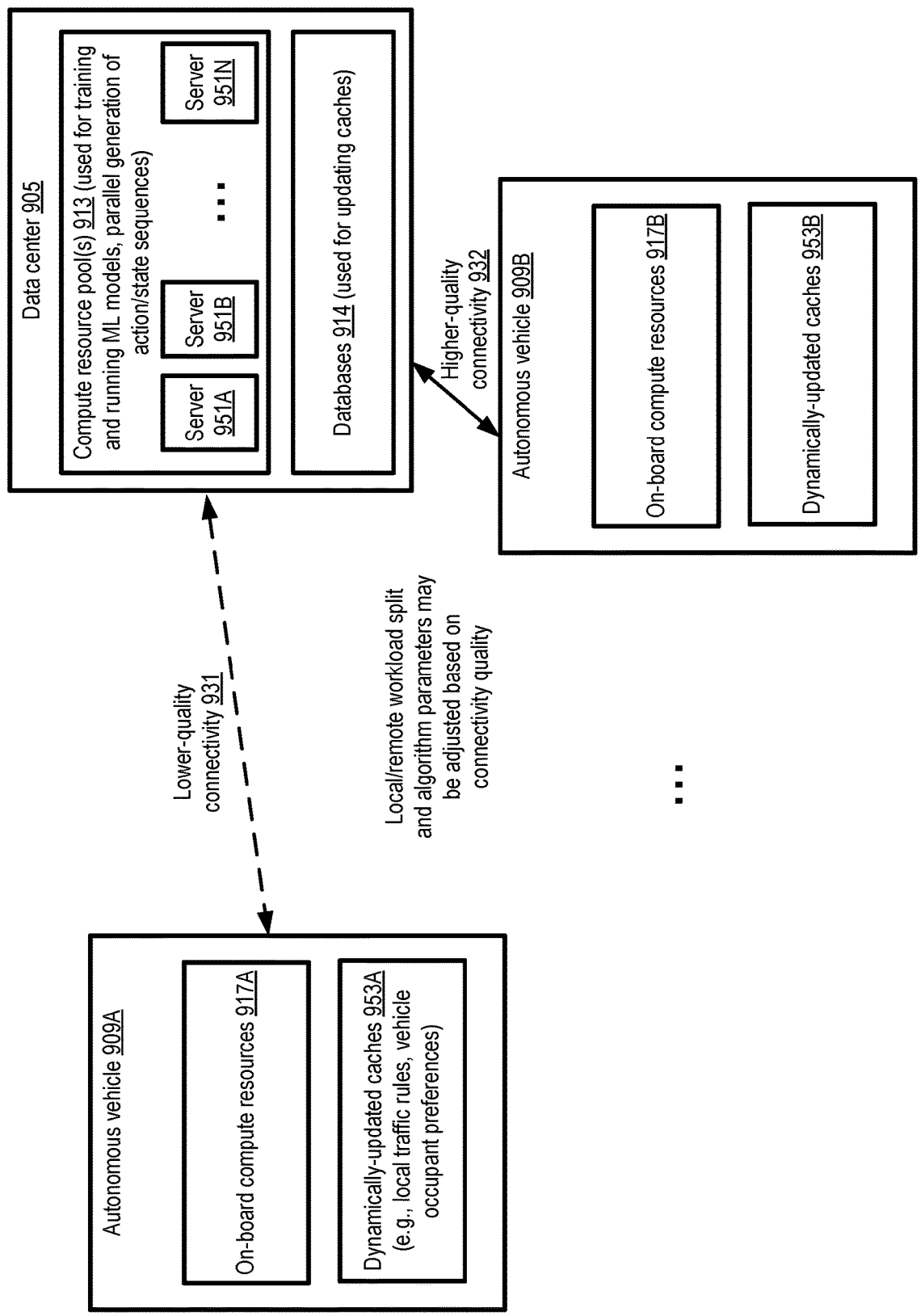
FIG. 9 illustrates examples of the distribution of planning activities between computing resource local to autonomous vehicles and remote data centers, according to at least some embodiments.

In some embodiments, computations of the decision-making components associated with an autonomous vehicle may be performed in a distributed manner, e.g., using local resources located in the vehicle itself as well as remote resources. FIG. 9 illustrates examples of the distribution of planning activities between computing resource local to autonomous vehicles and remote data centers, according to at least some embodiments. Two autonomous vehicles 909A and 909B are shown in the depicted embodiment, each of which is configured to utilize computing resources at a remote data center 905 to perform some subset of the processing required for decision making. The data center 905 may comprise, for example, one or more pools 913 of compute resources, such as servers 951A-951N. In some embodiments, at least some resource pools 913 or individual servers 951 may be optimized for performing machine learning operations—e.g., some servers may use graphical processing units (GPUs) more suitable for neural network algorithms than conventional CPUs. The resources of the data center may be used to train and run at least some of the machine learning models (including for example the kinds of neural networks discussed above) used by the behavior planners of the autonomous vehicles; thus, the behavior planners in effect may comprise some on-board components local to the vehicles and some remote components in the depicted embodiment. The compute resources of the data center may be set up in such a way that a number of different policies or {action, state} sequences can be generated in parallel at the data center 905 in at least some embodiments. In addition to computing resources in pools 913, the data center may also include one or more databases 914 containing location-specific or region-specific information which may be useful for decision making at the autonomous vehicles 909.

Each of the autonomous vehicles 909 may comprise a respective set of on-board computing resources 917 (e.g., resources 917A and 917B of vehicles 909A and 909B respectively), as well as a respective local cache 953 (e.g., dynamically-updated caches 953A and 953B of vehicles 909A and 909B respectively). Depending for example on the current location of a vehicle 909 and/or the identities of the current occupants, the caches 953 may be updated periodically from the data center's databases 914. For example, city-specific or neighborhood-specific traffic rules may be loaded into the caches as needed, occupant preferences (such as the relative weights to be assigned to different factors when selecting policies) may be updated when occupants change, and so on. It is noted that not all the autonomous vehicles may incorporate equivalent local computing resources—e.g., some vehicle models may contain more powerful processing devices and/or larger caches than others.

Based at least in part on the quality of the network connectivity between the autonomous vehicles 909 and the data center, different relative amounts of planning-related processing may be performed locally using on-board resources versus remotely in various embodiments. In general, the autonomous vehicles may attempt to establish and maintain high-bandwidth and low-latency communication channels with the data center 905. If the quality of the connectivity is high, as indicated by arrow 932 in the case of vehicle 909B, data may be transmissible at a high rate and with high fidelity to/from the data center 905, and as a result a larger fraction of the planning tasks may be performed at the data center. In contrast, if the connectivity is of lower quality (as indicated by arrow 931 with respect to vehicle 909A), a larger fraction of the decision-making logic may have to be implemented using on-board resources. In at least one embodiment, the tasks of collecting and processing sensor data, and the motion selector's operations, may be performed using local computing resources, while it may be possible (although not required) to perform at least a fraction of the behavior planner's functions at the data center. In various embodiments, because of the possibility of poor connectivity with the remote data center, the decision-making components of the vehicle may be designed such that they are capable of planning the vehicle's movements even if communications with the data center are not feasible for extended periods of time.

Figure 10:
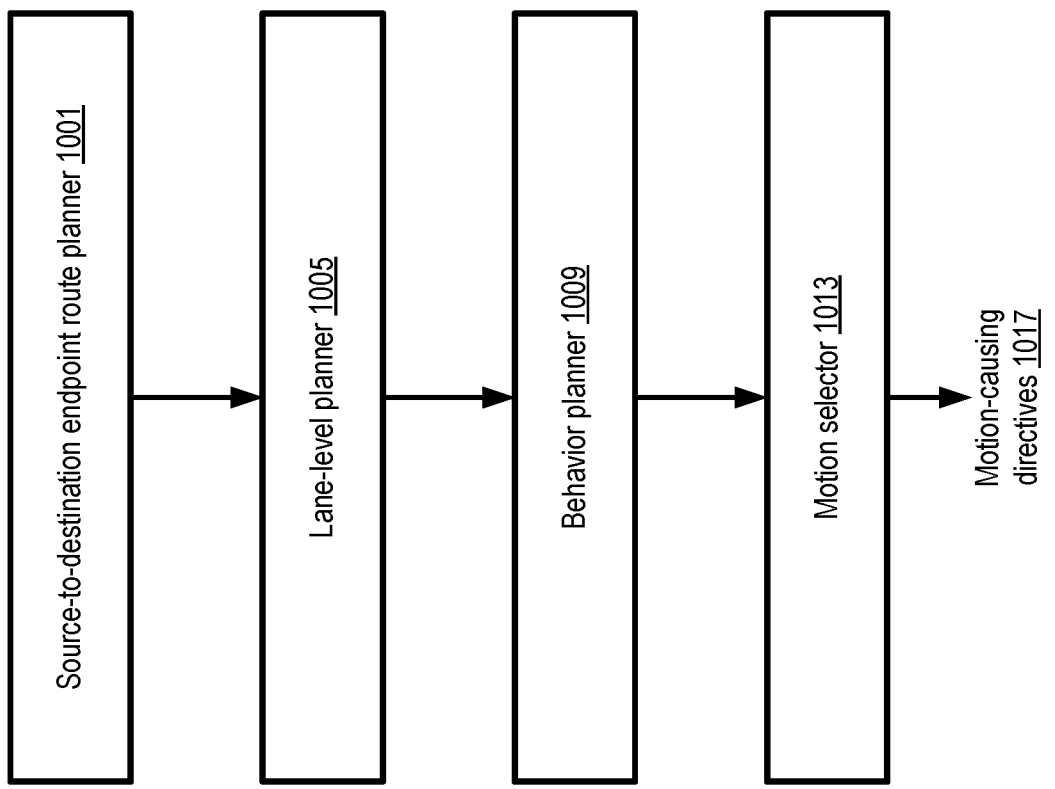
FIG. 10 illustrates an example flow of information within a four-tiered decision making system which may be employed at autonomous vehicles, according to at least some embodiments.

In system 100 of FIG. 1, two layers of motion-related decision-making components 116 were shown: a behavior planner and a motion selector. In various embodiments, additional layers of decision-making components may be used. FIG. 10 illustrates an example flow of information within a four-tiered decision making system which may be employed at autonomous vehicles, according to at least some embodiments. In the depicted embodiment, the granularity of the detail of the analysis (and the corresponding specificity of the output produced) increases from top to bottom. At the highest level, given a starting point (e.g., a current location of the vehicle before a given trip is begun, or at various points during the trip, which may for example be obtained via GPS sensors) and an ending point (a destination corresponding to an address provided by an occupant of the vehicle, e.g., verbally, using text input or using a touch-screen map), a route planner 1001 may identify the specific roads, highways etc. that are to be used for the trip. Current traffic information may be obtained, e.g., from a traffic reporting/analysis, to select a route which meets occupant-specified criteria (e.g., shortest time to destination, shortest distance covered, lowest toll, lowest carbon emissions, etc.). In some cases, an occupant of the vehicle may select a particular route from a set of candidate routes offered by the route planner 1001.

The high-level route plan may be provided as input (together with sensor data collected from the vehicle's sensors) to a lane-level planner 1005 in the depicted embodiment. The lane-level planner may analyze the positions and velocities of nearby or approaching vehicles, identify exits or turns indicated in the high-level route plan, and generate corresponding value functions as and when needed. The value functions may be provided as input to the behavior planner 1009. As discussed earlier, the policies generated by the behavior planner layer 1009 may be provided to the motion selector layer 1013. The motion selector layer may generate the low level directives 1017 that cause the motion of the vehicle. In at least some embodiments, at any given layer of the multi-layer decision making system, the outputs of each of the layers above may be available (either in their original form, or after transformations are applied by the intervening layer or layers), as well as the output produced by various sensors. The rates at which the sensor data are sampled may differ among the layers, with sensor data being obtained more frequently at lower layers than at higher layers.

Figure 11:
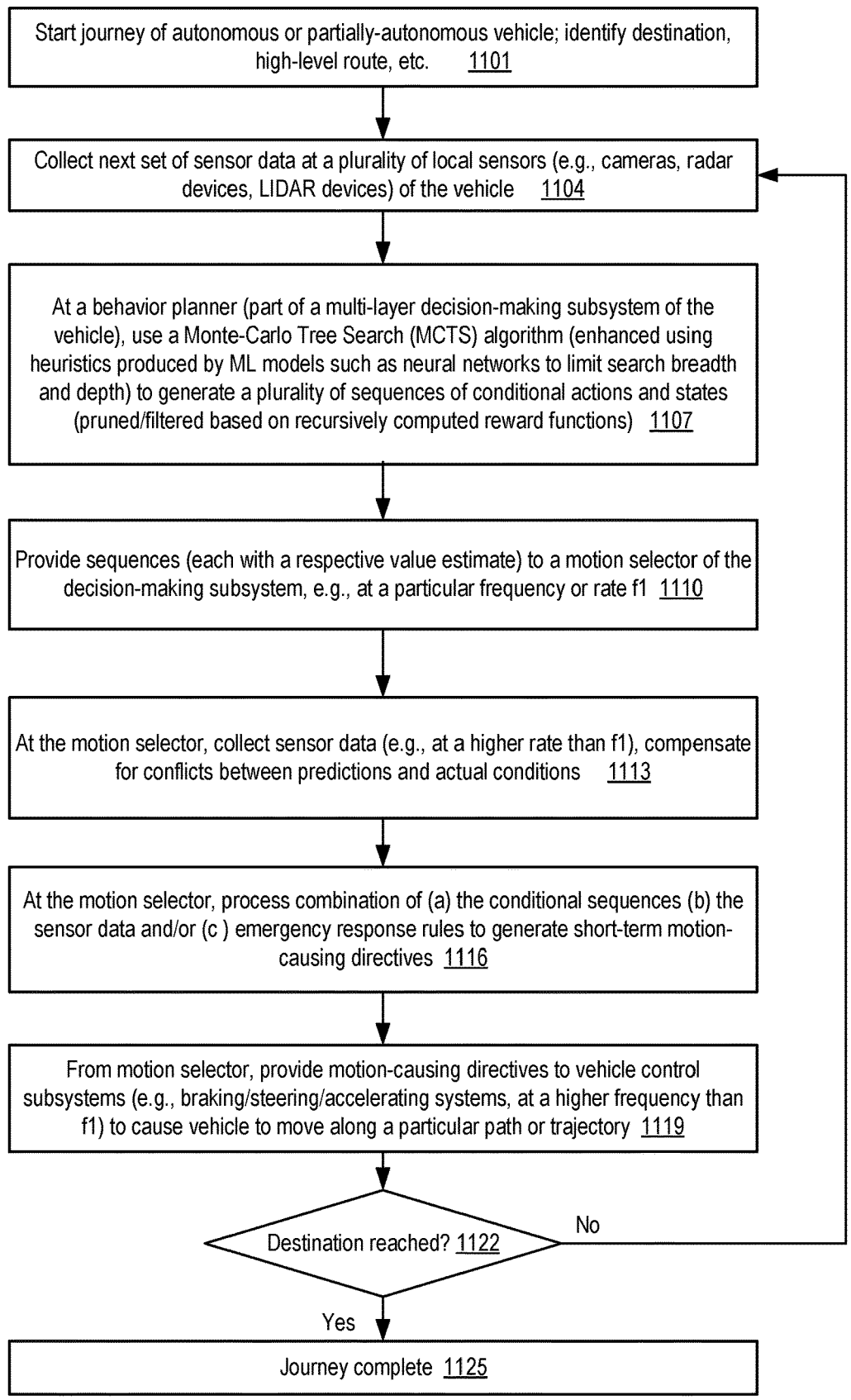
FIG. 11 is a flow diagram illustrating aspects of operations which may be performed at a system which utilizes tree searches optimized using neural networks to control the movement of an autonomous vehicle, according to at least some embodiments.

FIG. 11 is a flow diagram illustrating aspects of operations which may be performed at a system which utilizes tree searches optimized using neural networks to control the movement of an autonomous vehicle for a particular journey, according to at least some embodiments. As shown in element 1101, the destination for the journey (assuming that the present location of the vehicle is the origin for the journey) of the autonomous vehicle may be determined, e.g., in response to input received at the vehicle's decision-making system from an occupant. In one embodiment, for example, an occupant of the vehicle may indicate the destination verbally, while in other embodiments a touch-screen interface or a contact's address (e.g., on a smart phone's contacts application) may be used to indicate the destination. A high-level route comprising some sequence of roads and transitions (e.g., turns, highway entrances and exits, etc.) between the roads may be identified. (Of course, the high-level route itself may be changed dynamically, or deviated from, based on changing conditions.)

Once the journey is begun, the movements of the vehicle may be planned in a continuous iterative fashion, as new data about the environment becomes available and responses based on analyzing the new data can be generated. During a given iteration, sensor data from a plurality of local sensor devices (e.g., including various video cameras, near infrared cameras, depth cameras, radar devices, LIDAR devices and the like) of the autonomous vehicle may be collected and analyzed (element 1104).

A multi-layer decision making system may be employed for the vehicle, comprising at least a behavior planner layer and a motion selector layer. The behavior planner may utilize a Monte Carlo Tree Search (MCTS) algorithm, with the searches being optimized enhanced using heuristics obtained from one or more neural networks or other machine learning algorithms, to generate a plurality of alternative policies or conditional action sequences (element 1107). Individual actions may correspond to a few seconds of movement of the vehicle, and may include, for example, "change lanes to the right lane from a middle lane", "accelerate to speed X while remaining in the current lane", etc.

Each policy may comprise indications of the respective conditional probabilities associated with particular state transitions (which may result from the implementation of a given action) between pairs of states. A given state may represent known or estimated positions, attitudes, and velocities etc. for the autonomous vehicle being controlled as well as other vehicles and objects within some selected region(s) of potential influence around the autonomous vehicle (e.g., within a few hundred meters, depending on the speeds of the vehicles). Value estimates for the respective policies may also be generated (e.g., based on factors such as those discussed in the context of FIG. 5). In some embodiments in which neural networks are used to optimize the decision tree operations, the neural networks used may include one or more policy networks (which may collectively help to reduce the breadths of the tree searches) and/or a value network (which helps to reduce the depths of the tree searches) as described above. A combination of supervised learning (e.g., based on analysis of observed distributions of actions in various states) and reinforcement learning (e.g., based on simulations of driving behavior) may be used to obtain the heuristics. Sensor data may comprise part of the input used to generate the conditional action sequences in at least some embodiments.

At least a subset of the sequences and their values may be provided as input to the motion selector layer at a particular frequency or rate f1 in the depicted embodiment (element 1110). In addition to the plans, the motion selector may also sample sensor data from the vehicle's sensors, e.g., at a higher rate than f1 (element 1113). The motion selector and/or the behavior planner may also be responsible for compensating for incomplete or noisy sensor data sets—e.g., caused by obstructed or partially obscured views of the surroundings in various embodiments. In some embodiments, an observation model may be constructed for handling such partially observed data. In locations which are not fully visible, for example, the model may comprise assumptions regarding possible distributions (in position and velocity) of other vehicles, e.g., based on actual observations of visible portions of the current environment and/or on recorded data for similar environments. Time-series measurements of vehicles (e.g., in other similar environments) may be used to infer the presence and likely trajectories of other vehicles. Extra branches corresponding to the inferred vehicles may be added to the decision trees being used to plan the autonomous vehicle's own actions in some such embodiments.

The combination of the sensor data, the action sequences and a set of emergency response rules may be used to generate short-term motion-causing directives at the motion selector in the depicted embodiment (element 1116). The motion selector, which has access to more recent sensor data than was used for generating the action sequences at the behavior planner, may be responsible for compensating for conflicts between predictions made by the behavior planner and actual observed conditions in the depicted embodiment. Additional details regarding the working of the motion selector in various embodiments are provided in the discussion regarding FIG. 12 below. From the motion selector, the directives may be transmitted to various control subsystems of the vehicle (element 1119) which may cause the vehicle to proceed along a selected trajectory. It is noted that in at least some cases, the actual realized or achieved trajectory of the vehicle may differ from those corresponding to the action sequences generated by the behavior planner—that is, the motion selector may override the proposed decisions generated at the behavior planner based on more current and/or more complete data. In the depicted embodiment, the outputs from the motion selector may be generated and transmitted at a higher frequency than the frequency at which the action sequences are received from the behavior planner. In other embodiments, the output of the motion selector may not necessarily be produced at a faster rate than the output of the behavior planner. If the destination has been reached (as detected in operations corresponding to element 1122), the journey may be considered complete (element 1125). Otherwise, the next iteration of decisions regarding the subsequent movements of the autonomous vehicle, given its current state, may be made using operations similar to those indicated in elements 1104-1122.

Figure 12:
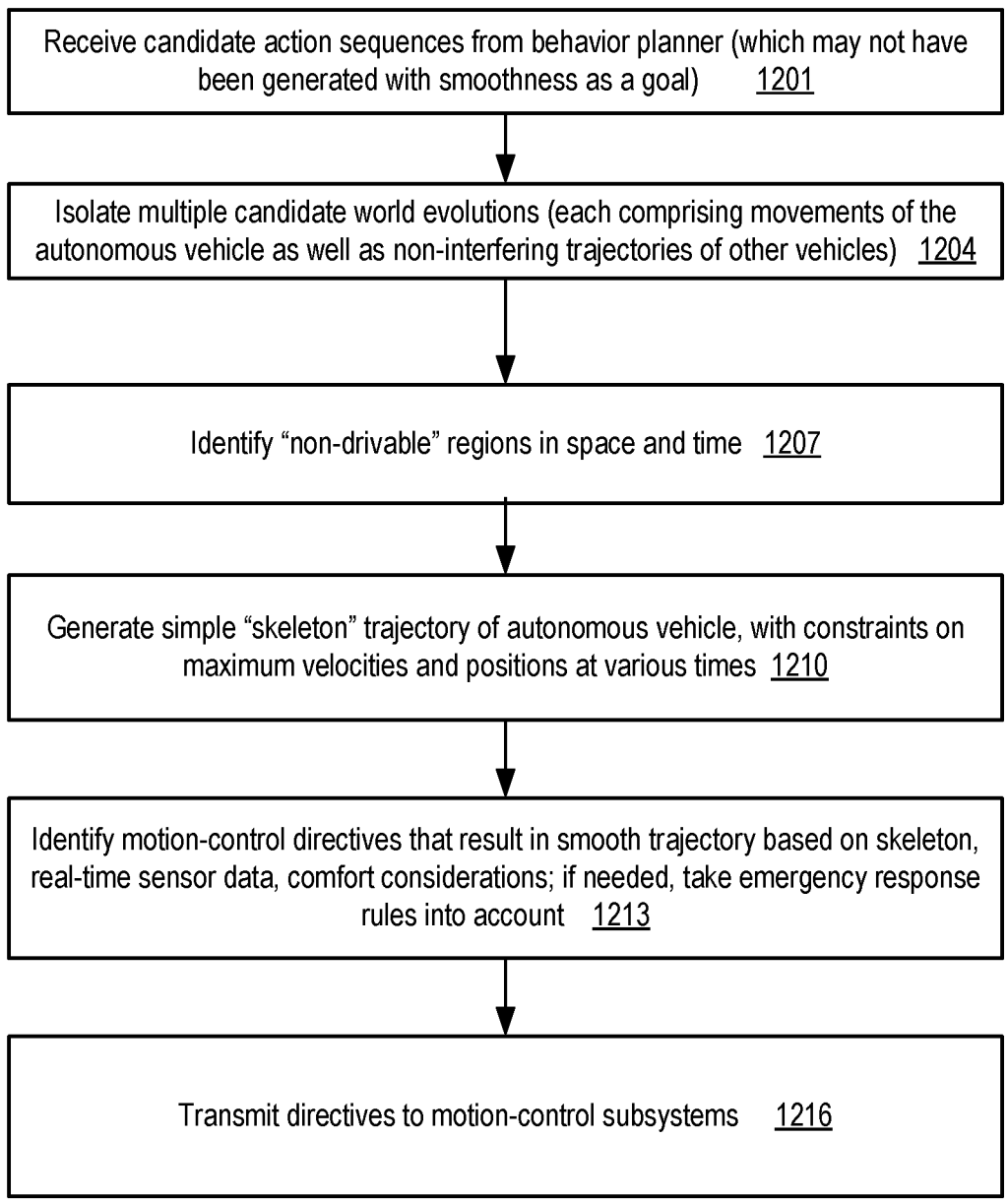
FIG. 12 is a flow diagram illustrating aspects of operations which may be performed at a motion selector of an autonomous vehicle, according to at least some embodiments.

FIG. 12 is a flow diagram illustrating aspects of operations which may be performed at a motion selector of an autonomous vehicle, according to at least some embodiments. As shown in element 1201, the motion selector may receive candidate action sequences from the behavior planner, e.g., at fixed intervals or at varying intervals. In the depicted embodiment, the action sequences may have been identified and selected at the behavior planner without necessarily taking the smoothness or comfort level of the journey (as likely to be perceived by the occupants), and the responsibilities of the motion selector may comprise smoothing out the actual trajectories to the extent possible in such embodiments.

The motion selector may identify or isolate multiple candidate world evolutions corresponding to a given action sequence (element 1204), where each candidate world comprises a possible motion of the autonomous vehicle, as well as corresponding non-interfering trajectories of a set of other vehicles.

Based on the different world evolutions, a set of non-drivable regions in time and space may be identified (element 1207). A region may be considered non-drivable, for example, if the probability of a collision with another vehicle in at least one of the candidate world evolutions exceeds a threshold, or if the acceleration or deceleration required to reach the region exceeds a threshold. Then, a simple "skeleton" trajectory for the autonomous vehicle may be generated taking the non-drivable regions into account (element 1210), with constraints on the maximum velocities and positions of the autonomous vehicle at various points in time.

Given the constraints of the skeleton trajectory, real-time sensor data, and occupant comfort considerations, the specific set of motion control directives to be issued by the motion selector may be identified (element 1213) and provided to the appropriate motion control subsystems (element 1216) in the depicted embodiment.

It is noted that in various embodiments, at least some operations other than those illustrated in the flow diagrams of FIG. 11 and FIG. 12 may be used to implement the decision making techniques for vehicle motion control described above. Some of the operations shown may not be implemented in some embodiments or may be implemented in a different order, or in parallel rather than sequentially. For example, input data regarding the environment may be collected more or less continuously, in parallel with the processing of some of the other steps of decision making, at various sensors of the autonomous vehicle in various embodiments. Also, as mentioned earlier, in some cases, multiple action sequences may be generated and/or evaluated in parallel in at least some implementations, e.g., using separate sets of computing resources.

Figure 13:
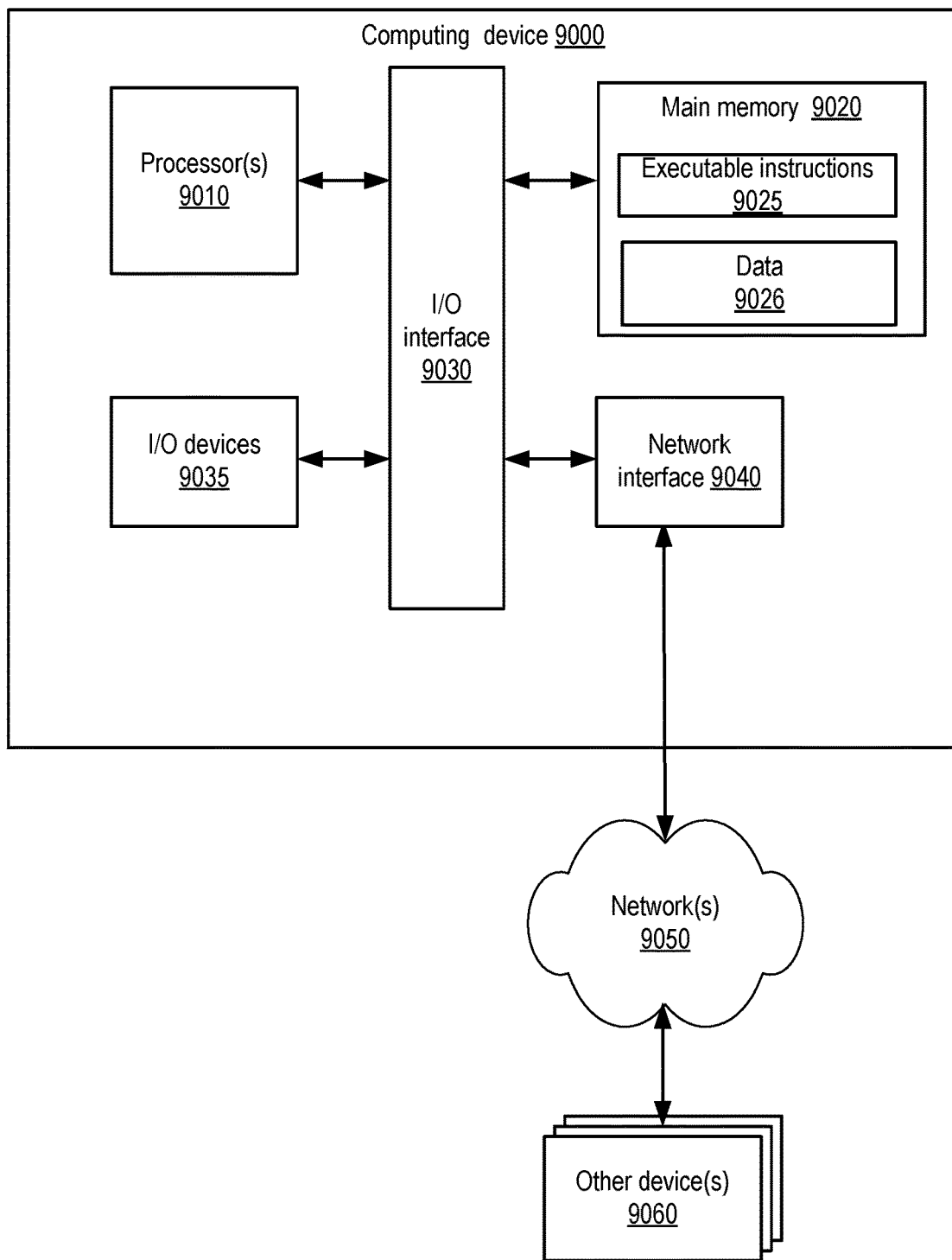
FIG. 13 is a block diagram illustrating an example computing device that may be used in at least some embodiments.

In at least some embodiments, a server that implements a portion or all of one or more of the decision-making technologies described herein, including the techniques to collect, obtain or process sensor signals of various types, to train and execute machine learning algorithms including neural network algorithms, tree searches and the like, may include a general-purpose computer system that includes or is configured to access one or more computer-accessible media. FIG. 13 illustrates such a general-purpose computing device 9000. In the illustrated embodiment, computing device 9000 includes one or more processors 9010 coupled to a main memory 9020 (which may comprise both non-volatile and volatile memory modules, and may also be referred to as system memory) via an input/output (I/O) interface 9030. Computing device 9000 further includes a network interface 9040 coupled to I/O interface 9030, as well as additional I/O devices 9035 which may include sensors of various types.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

Memory 9020 may be configured to store instructions and data accessible by processor(s) 9010. In at least some embodiments, the memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (Re-RAM), three-dimensional NAND technologies, Ferroelectric RAM, magnetoresistive RAM (MRAM), or any of various types of phase change memory (PCM) may be used at least for the non-volatile portion of system memory. In the illustrated embodiment, executable program instructions 9025 and data 1926 implementing one or more desired functions, such as those methods, techniques, and data described above, are shown stored within main memory 9020.

In one embodiment, I/O interface 9030 may be configured to coordinate I/O traffic between processor 9010, main memory 9020, and various peripheral devices, including network interface 9040 or other peripheral interfaces such as various types of persistent and/or volatile storage devices, sensor devices, etc. In some embodiments, I/O interface 9030 may perform any necessary protocol, timing or other data transformations to convert data signals from one component (e.g., main memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 12, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, main memory 9020 may be one embodiment of a computer-accessible medium configured to store program instructions and data as described above for FIG. 1 through FIG. 12 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as main memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 13 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a behavior planner implemented using one or more computing devices; and
a motion selector of a vehicle, wherein the vehicle comprises one or more motion control subsystems;
wherein the behavior planner is configured to:
generate, using a combination of (a) a Monte Carlo Tree Search (MCTS) algorithm and (b) heuristics obtained from one or more machine learning models for the MCTS algorithm, a plurality of conditional action sequences corresponding to the vehicle, including a first conditional action sequence and a second conditional action sequence, wherein the first conditional action sequence corresponds to a first set of anticipated states of the vehicle, and wherein the second conditional action sequence corresponds to a second set of anticipated states of the vehicle;
provide, at a first transmission rate, at least some conditional action sequences of the plurality of conditional action sequences to the motion selector; and
wherein the motion selector is configured to:
generate, based at least in part on (a) one or more conditional action sequences provided by the behavior planner and (b) sensor data obtained at a second transmission rate, one or more motion-control directives, wherein the second rate exceeds the first rate; and
transmit the one or more motion-control directives to the one or more motion control subsystems.

2. The system as recited in claim 1, wherein the one or more machine learning models include (a) a first neural network model which provides a heuristic to identify, at a particular level of a particular tree, a subset of nodes to be included in a search, and (b) a second neural network model which provides a heuristic to limit a depth of the search within the particular tree.

3. The system as recited in claim 1, wherein to generate the plurality of conditional action sequences, the behavior planner is configured to:
utilize a statistical distribution of a particular set of actions taken by one or more entities under a particular set of driving conditions, wherein the first conditional action sequence includes a proposed implementation of a first action of the particular set, and wherein the second conditional action sequence includes a proposed implementation of a second action of the particular set.

4. The system as recited in claim 1, wherein the one or more motion-causing directives are transmitted to the one or more motion control subsystems at a higher transmission rate than the first transmission rate.

5. The system as recited in claim 1, wherein to generate the plurality of conditional action sequences, the behavior planner is configured to utilize an analysis of recorded driver behavior.

6. The system as recited in claim 1, wherein to generate the plurality of conditional action sequences, the behavior planner is configured to utilize an analysis of simulated driver behavior.

7. The system as recited in claim 1, wherein prior to providing a particular conditional action sequence to the motion selector, the behavior planner is configured to:
verify that the first conditional action sequence meets an acceptance criterion defined in terms of one or more of: (a) a timely arrival at a destination (b) physical feasibility (c) traffic rules compliance or (c) an estimated experience comfort level of a vehicle occupant.

8. The system as recited in claim 1, further comprising a lane-level planner; wherein the behavior planner is configured to generate the one or more conditional action sequences based at least in part on first set of data provided by the lane-level planner.

9. The system as recited in claim 8, further comprising a route planner, wherein the lane-level planner is configured to generate the first set of data based at least in part on another set of data generated by the route planner.

10. The system as recited in claim 1, wherein the behavior planner is configured to estimate, corresponding to a particular anticipated state corresponding to the first conditional action sequence, a value based at least in part on (a) an anticipated social interaction with an occupant of another vehicle, (b) an extent to which traffic rules are followed or (c) an anticipated comfort level of an occupant of the vehicle.

11. A method, comprising:
performing, by one or more computing devices of a behavior planner for a vehicle:
generating, using a combination of (a) a tree search algorithm and (b) heuristics produced by one or more machine learning models, a plurality of conditional action sequences with respect to the vehicle, including a first conditional action sequence and a second conditional action sequence, wherein the first conditional action sequence corresponds to a first set of anticipated states of the vehicle, and wherein the second conditional action sequence corresponds to a second set of anticipated states of the vehicle; and
providing at least some conditional action sequences of the plurality of conditional action sequences to a motion selector of the vehicle; and
generating, by the motion selector, based at least in part on (a) one or more conditional action sequences provided by the behavior planner and (b) respective data sets obtained from one or more sensors of the vehicle, one or more motion-control directives; and
transmitting, by the motion selector, the one or more motion-control directives to one or more motion control subsystems of the vehicle.

12. The method as recited in claim 11, wherein the one or more machine learning models include (a) a first model trained using a supervised learning algorithm, and (b) a second model trained using a reinforcement learning algorithm.

13. The method as recited in claim 11, wherein at least one computing device of the one or more computing devices is located at a data center, the method further comprising:
establishing a communication channel between the vehicle and the data center; wherein providing the at least some conditional action sequences comprises utilizing the communication channel.

14. The method as recited in claim 11, wherein generating the plurality of conditional action sequences comprises:
utilizing a first computing device to generate the first conditional action sequence;
utilizing a second computing device to generate the second conditional action sequence, wherein generation of at least a portion of the second conditional action sequence overlaps in time with generation of at least a portion of the first conditional action sequence.

15. The method as recited in claim 11, wherein the respective data sets comprise at least one data set corresponding to a partially-obstructed view.

16. A non-transitory computer-accessible storage medium storing program instructions that when executed on one or more processors implements a behavior planner for a vehicle, wherein the behavior planner is configured to:
obtain respective data sets from one or more sensors of the vehicle;
generate, using at least the respective data sets and a combination of (a) a tree search algorithm and (b) heuristics generated by one or more machine learning models, a first set of conditional action sequences with respect to the vehicle, including a first conditional action sequence and a second conditional action sequence, wherein the first conditional action sequence corresponds to a first set of anticipated states of the vehicle, and wherein the second conditional action sequence corresponds to a second set of anticipated states of the vehicle;
provide one or more conditional action sequences of the first set as input to a motion selector of the vehicle, wherein the motion selector is configured to utilize the one or more conditional action sequences to issue one or more motion-control directives which cause the vehicle to move.

17. The non-transitory computer-accessible storage medium as recited in claim 16, wherein the one or more machine learning models include (a) a first neural network model which provides a heuristic to optimize a tree search with respect to tree breadth, and (b) a second neural network model which provides a tree search to restrict a tree search with respect to tree depth.

18. The non-transitory computer-accessible storage medium as recited in claim 16, wherein the behavior planner is configured to:
utilize a statistical distribution of a particular set of actions taken by one or more entities under a first set of driving conditions, wherein the first conditional action sequence includes a proposed implementation of a first action of the particular set, and wherein the second conditional action sequence includes a proposed implementation of a second action of the particular set.

19. The non-transitory computer-accessible storage medium as recited in claim 16, wherein the behavior planner is configured to generate the first set of conditional action sequences based at least in part on input received from one or more of: (a) a lane-level planner (b) a route planner.

20. The non-transitory computer-accessible storage medium as recited in claim 16, wherein the one or more sensors include one or more of: (a) an externally-oriented camera, (b) an occupant-oriented sensor, (c) a physiological signal detector, (d) a Global Positioning System (GPS) device, (e) a radar devices or (f) a LIDAR device.

* * * * *